US012602166B2

(12) United States Patent
Kim et al.

(10) Patent No.: US 12,602,166 B2
(45) Date of Patent: Apr. 14, 2026

(54) SYSTEM-ON-CHIP FOR CONTROLLING MEMORY DEVICES AND ITS DATA TRAINING METHOD

(71) Applicant: SAMSUNG ELECTRONICS CO., LTD., Suwon-si (KR)

(72) Inventors: Daero Kim, Suwon-si (KR); Boyoung Kang, Suwon-si (KR); Ji Hun Oh, Suwon-si (KR); Kyoungwon Lee, Suwon-si (KR); Kwanyeob Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/890,080

(22) Filed: Sep. 19, 2024

(65) Prior Publication Data

US 2025/0244877 A1 Jul. 31, 2025

(30) Foreign Application Priority Data

Jan. 25, 2024 (KR) ........................ 10-2024-0011647

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 13/1689; G11C 2207/2254
See application file for complete search history.

(56) References Cited

U.S. PATENT DOCUMENTS

| | | | |
|---|---|---|---|
| 6,442,644 | B1 | 8/2002 | Gustavson et al. |
| 6,631,440 | B2 | 10/2003 | Jenne et al. |
| 8,250,322 | B2 | 8/2012 | Huang et al. |
| 8,391,089 | B2 | 3/2013 | Chen et al. |
| 9,100,027 | B2 | 8/2015 | Iyer et al. |

(Continued)

OTHER PUBLICATIONS

Angeli, Nico, and Klaus Hofmann. “Fast digital clock calibration of a differential 6.4 Gb/s/pin bidirectional asymmetric memory interface.” IEEE Transactions on Circuits and Systems II: Express Briefs 67.11 (2020): 2387-2391. (Year: 2020).*

(Continued)

*Primary Examiner* — Nicholas J Simonetti
(74) *Attorney, Agent, or Firm* — Fish & Richardson P.C.

(57) ABSTRACT

Disclosed is a SoC. The SoC communicating with a memory device includes a memory interface that exchanges a command and data with the memory device, and a control logic circuit that transmits a clock signal and a plurality of data signals to the memory device through the memory interface. The control logic circuit sequentially transmits pieces of first data with different delay times to the memory device through the memory interface based on a pre-stored first edge code, continuously transmits, to the memory device, a plurality of read commands for reading the pieces of first data stored in the memory device from the memory device, and obtains a first delay value including an extent, to which the pieces of first data are delayed, based on a data pattern of each of pieces of first reception data read from the memory device in response to the plurality of read commands.

20 Claims, 14 Drawing Sheets

(56) References Cited

U.S. PATENT DOCUMENTS

| | | | | |
|---|---|---|---|---|
| 10,297,311 | B1 | 5/2019 | Yuan et al. | |
| 10,573,360 | B1 | 2/2020 | Ferreira et al. | |
| 10,832,787 | B2 | 11/2020 | Fung et al. | |
| 11,232,827 | B2 | 1/2022 | Hampel et al. | |
| 11,507,280 | B2 | 11/2022 | Ware et al. | |
| 11,551,743 | B2 | 1/2023 | Best | |
| 11,664,062 | B2 | 5/2023 | Wang et al. | |
| 2009/0154256 | A1* | 6/2009 | Kim | G11C 7/22 365/194 |
| 2018/0267810 | A1* | 9/2018 | Madpur | G06F 9/4401 |
| 2019/0004984 | A1* | 1/2019 | Lee | G06F 18/28 |
| 2023/0205435 | A1 | 6/2023 | Murphy et al. | |
| 2023/0230628 | A1 | 7/2023 | Lim et al. | |
| 2023/0386563 | A1 | 11/2023 | So | |

OTHER PUBLICATIONS

Extended European Search Report in European Appln. No. 25150317.3, mailed on Jun. 26, 2025, 9 pages.

* cited by examiner

【FIG. 1】
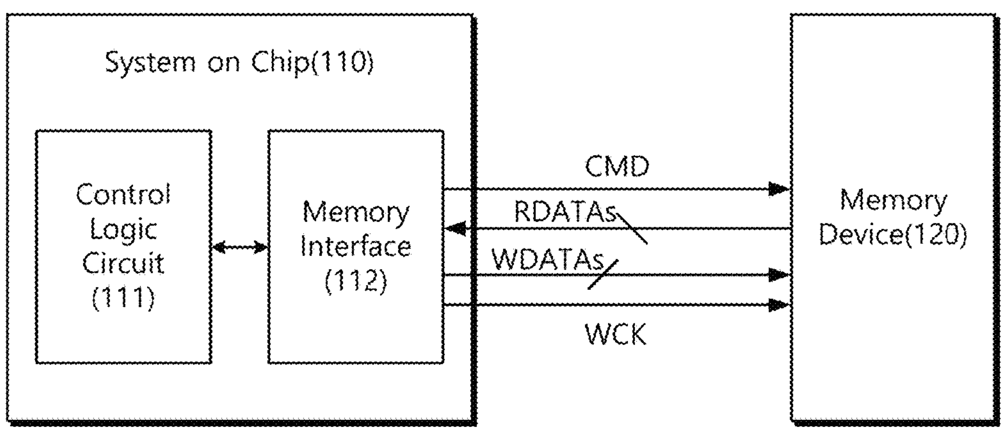

【FIG. 2A】
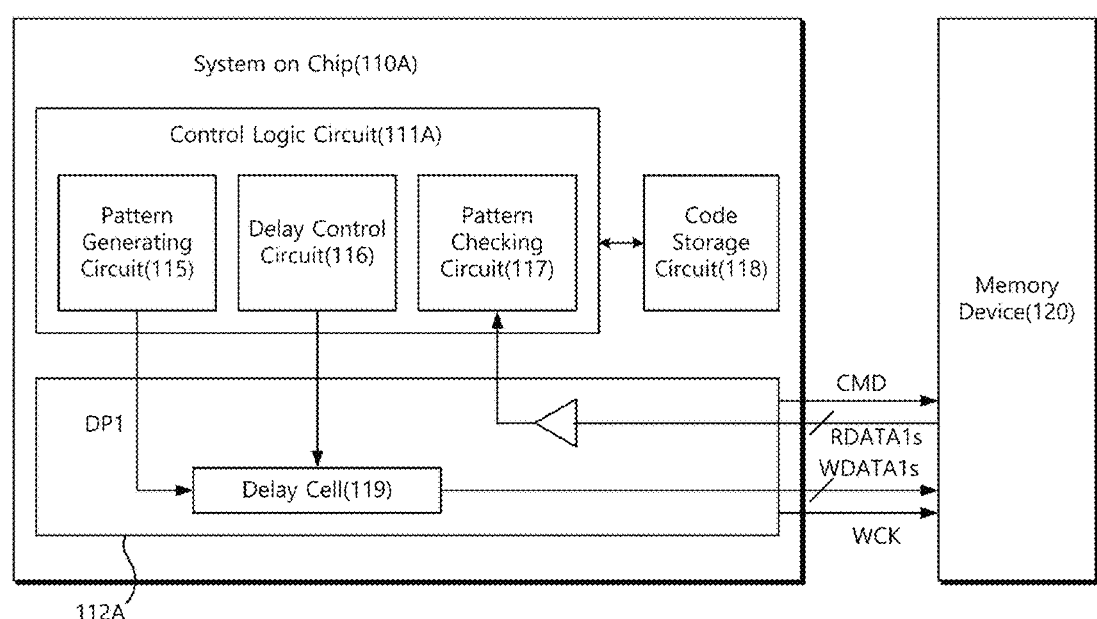

【FIG. 2B】
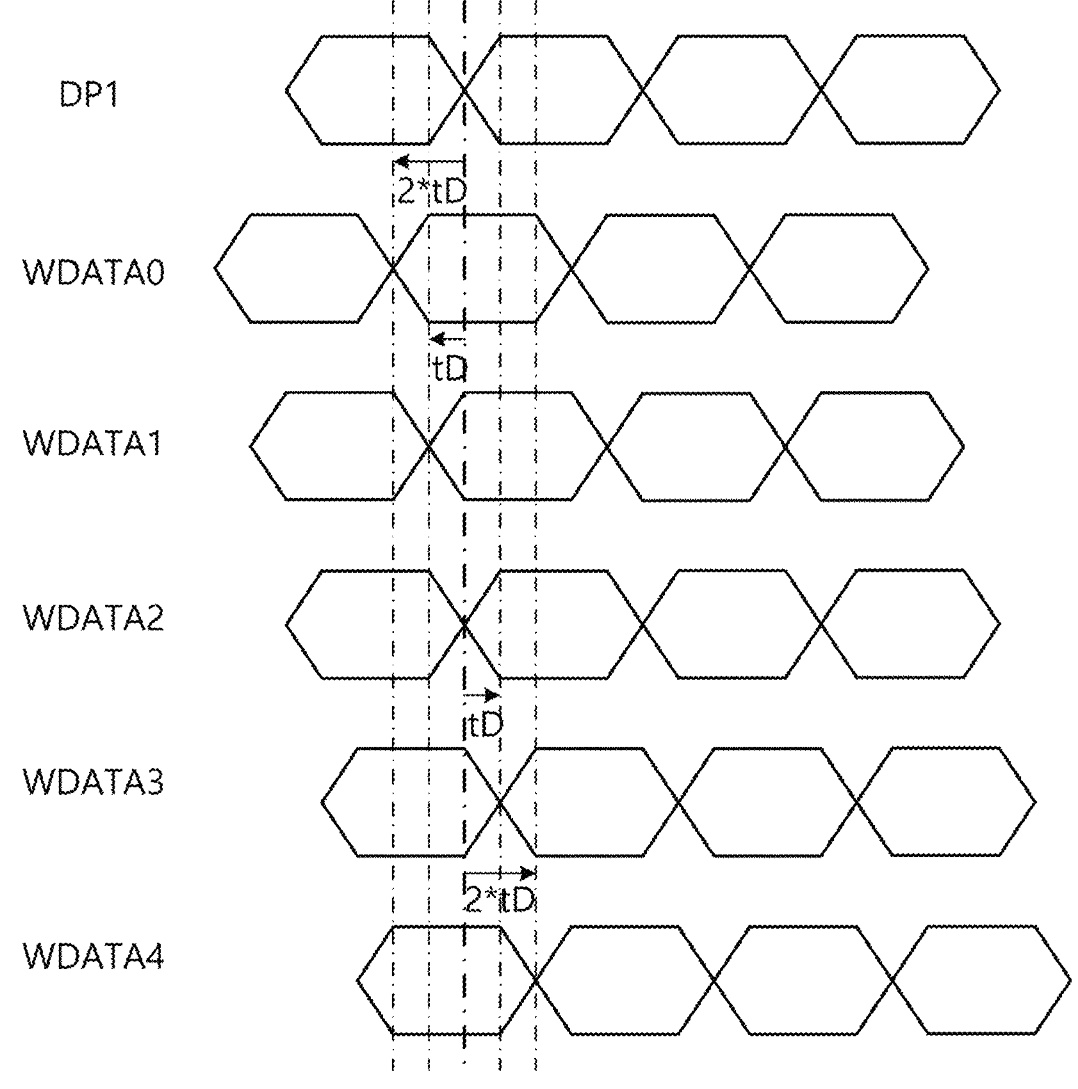

【FIG. 3A】
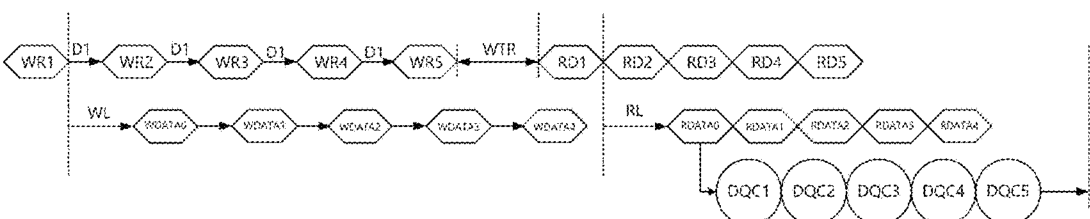

【FIG. 3B】
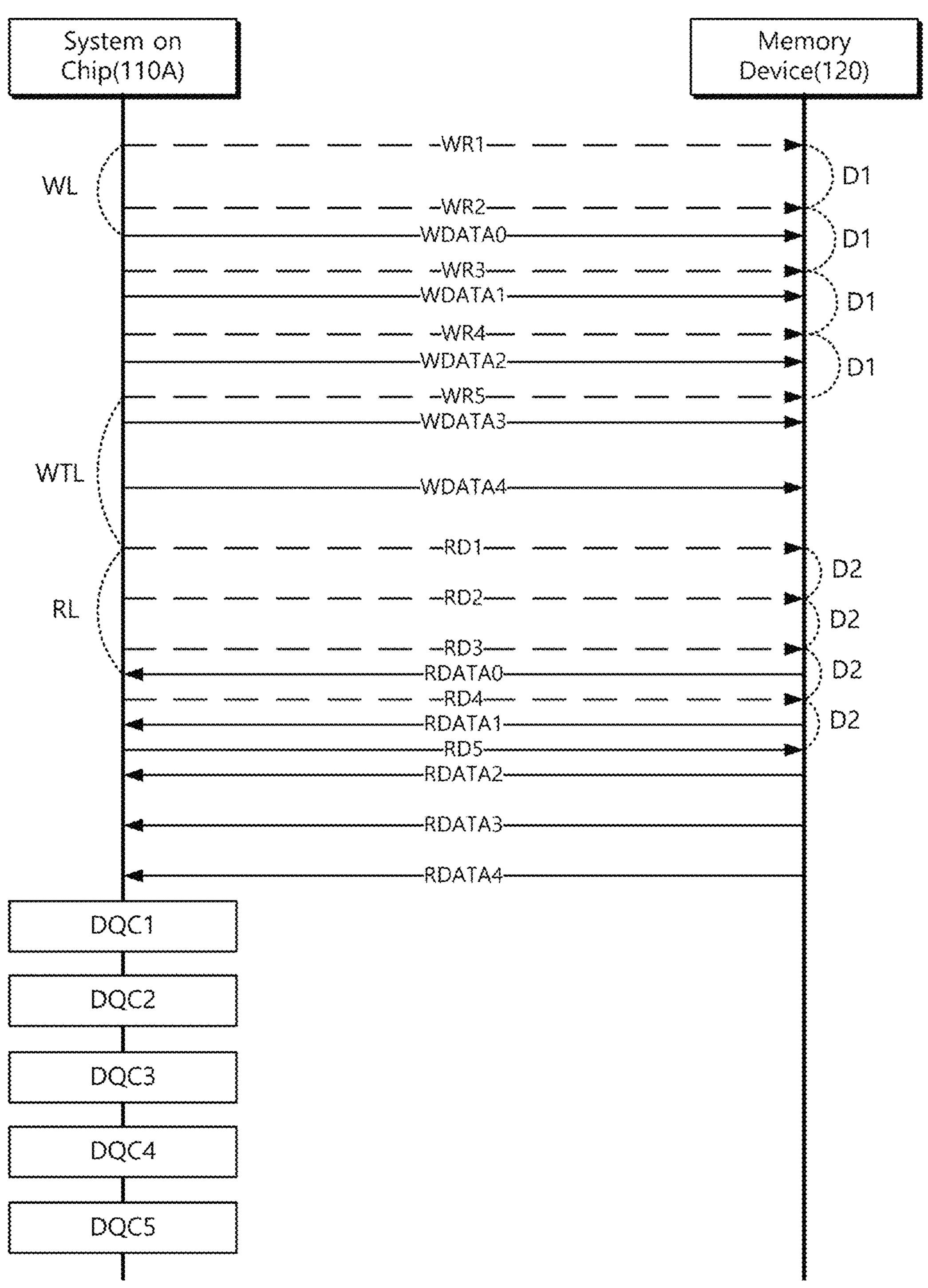

【FIG. 4】
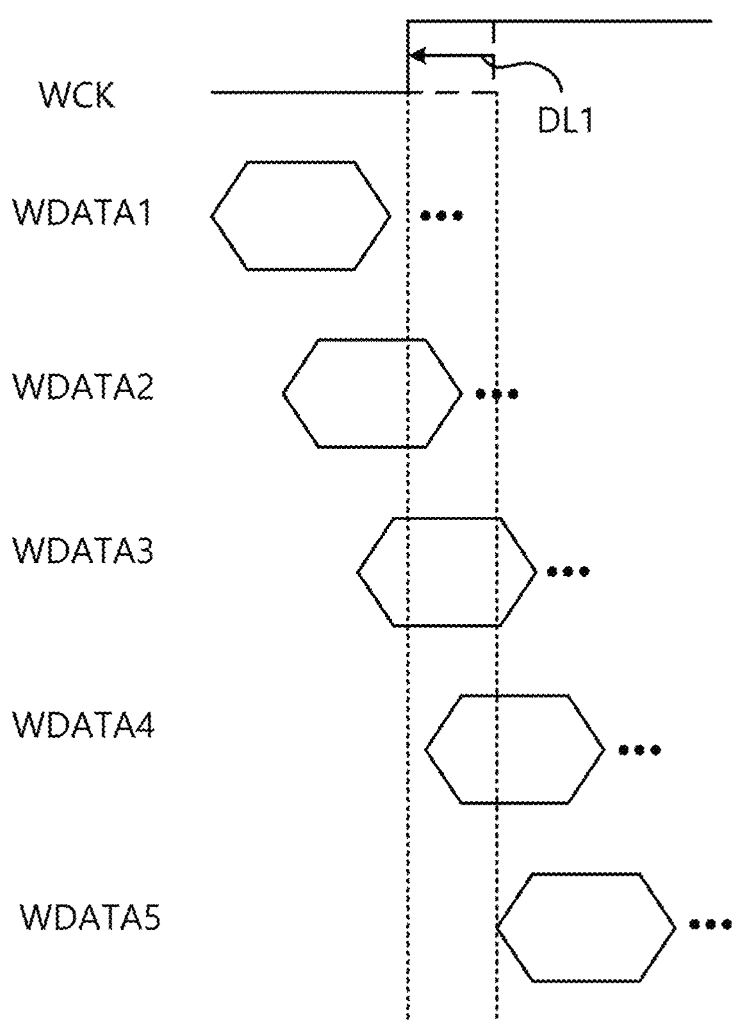

【FIG. 5】
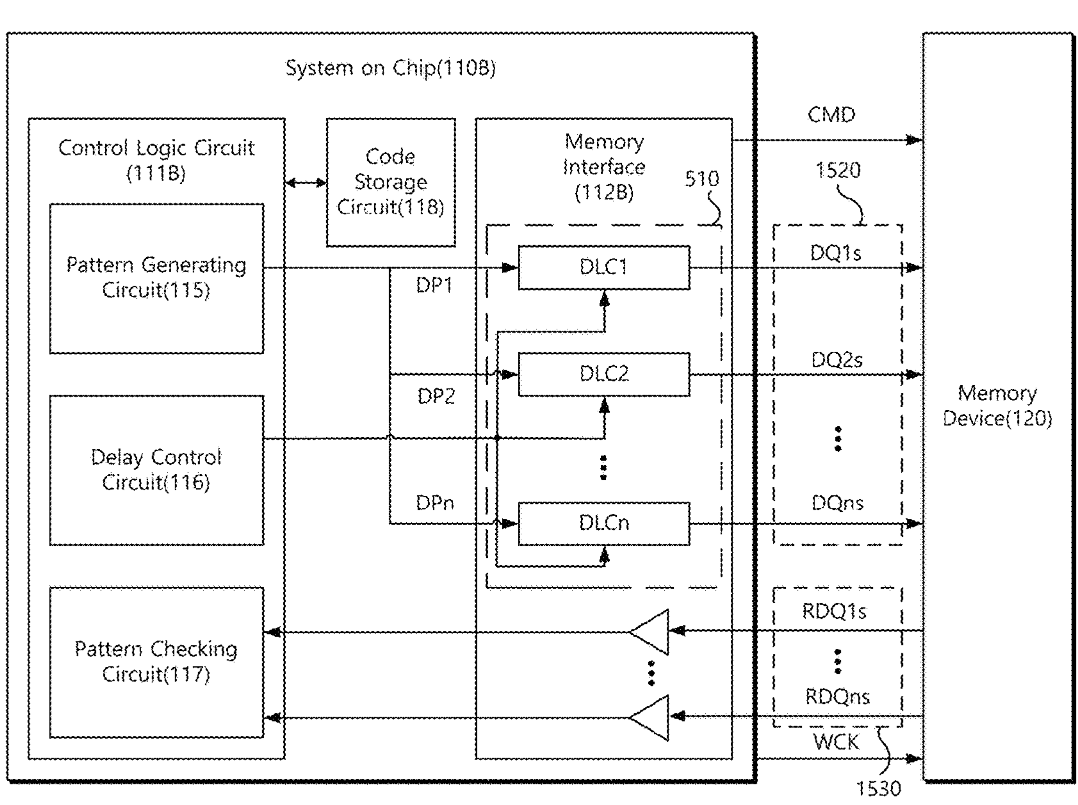

【FIG. 6】
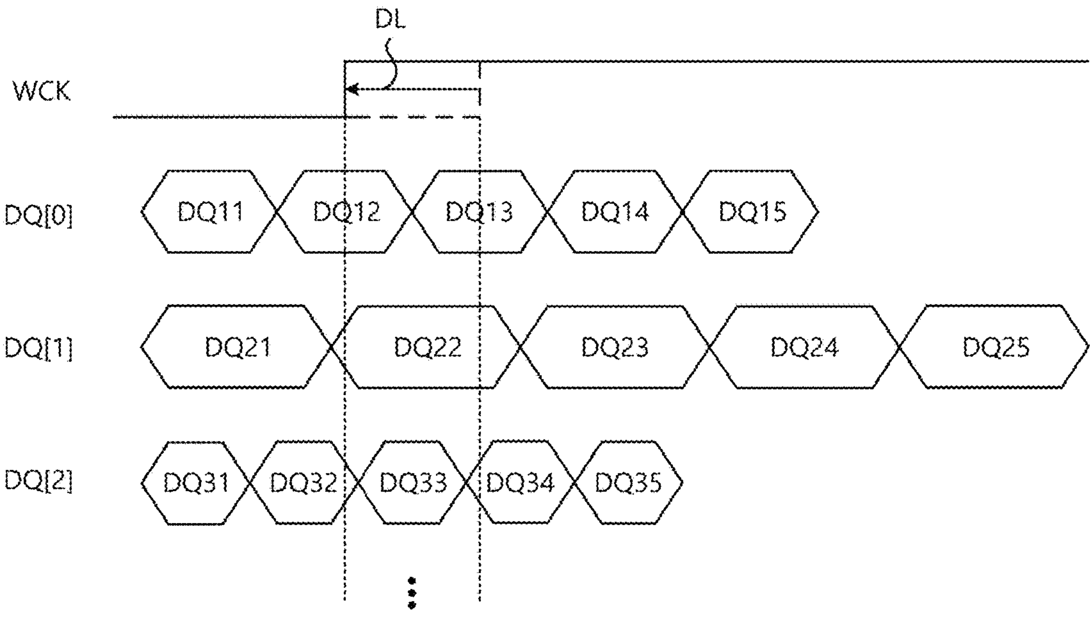

【FIG. 7】
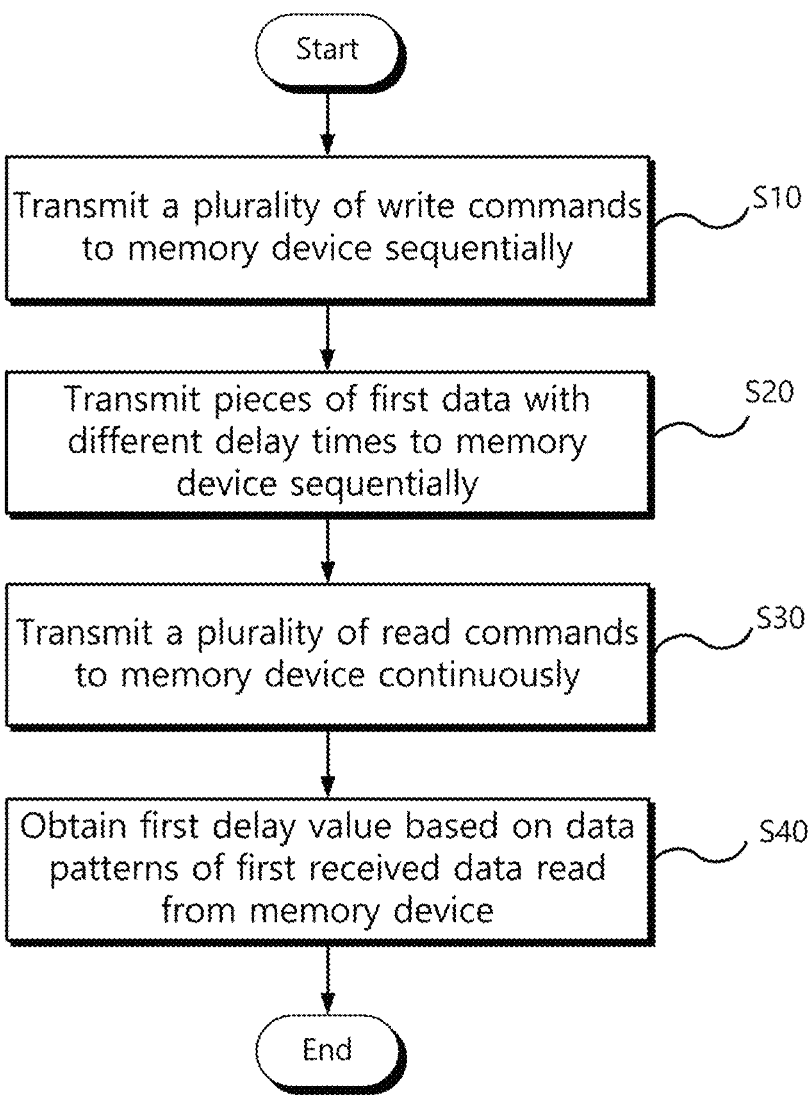

【FIG. 8】
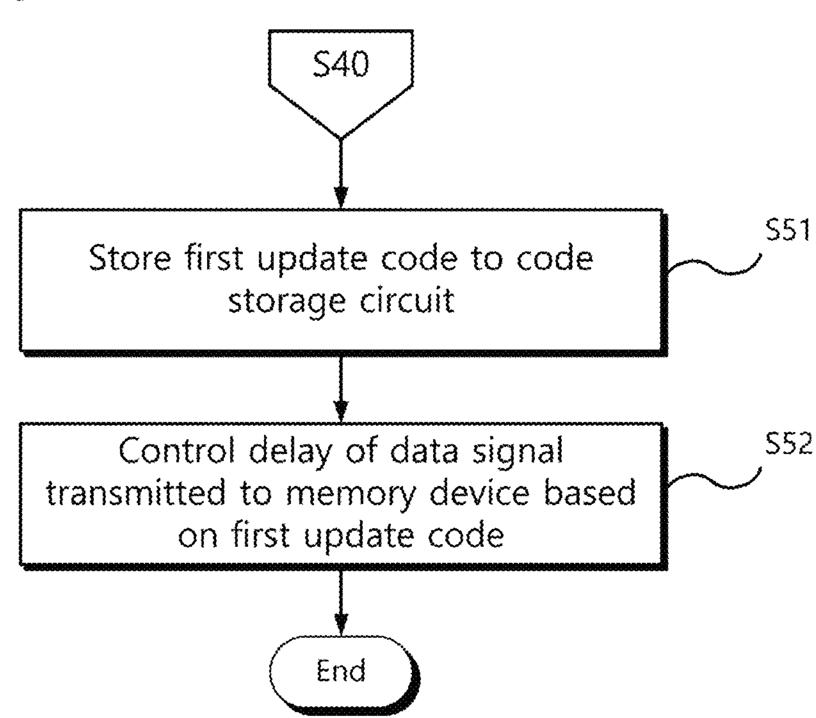

【FIG. 9】
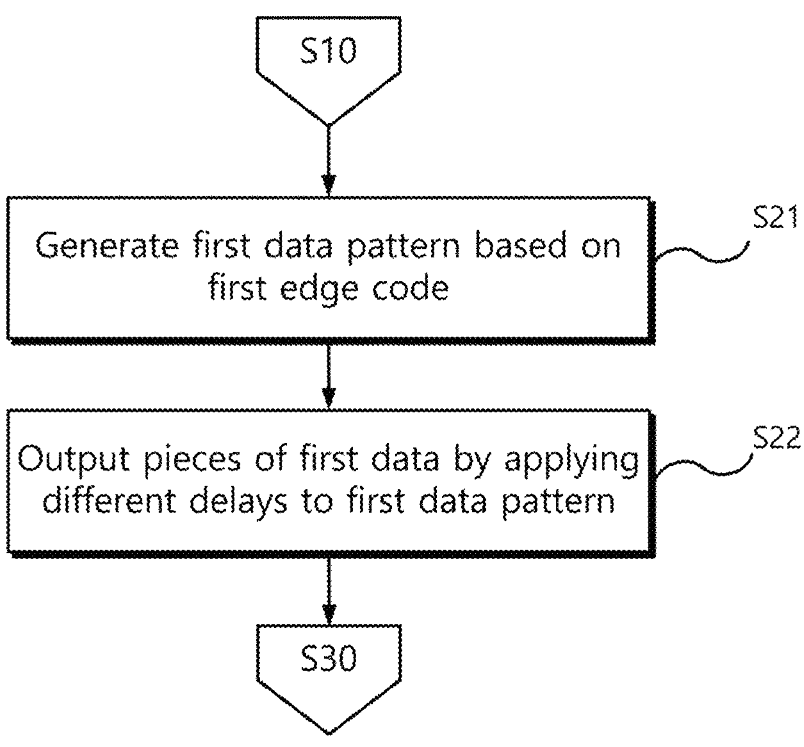

【FIG. 10】
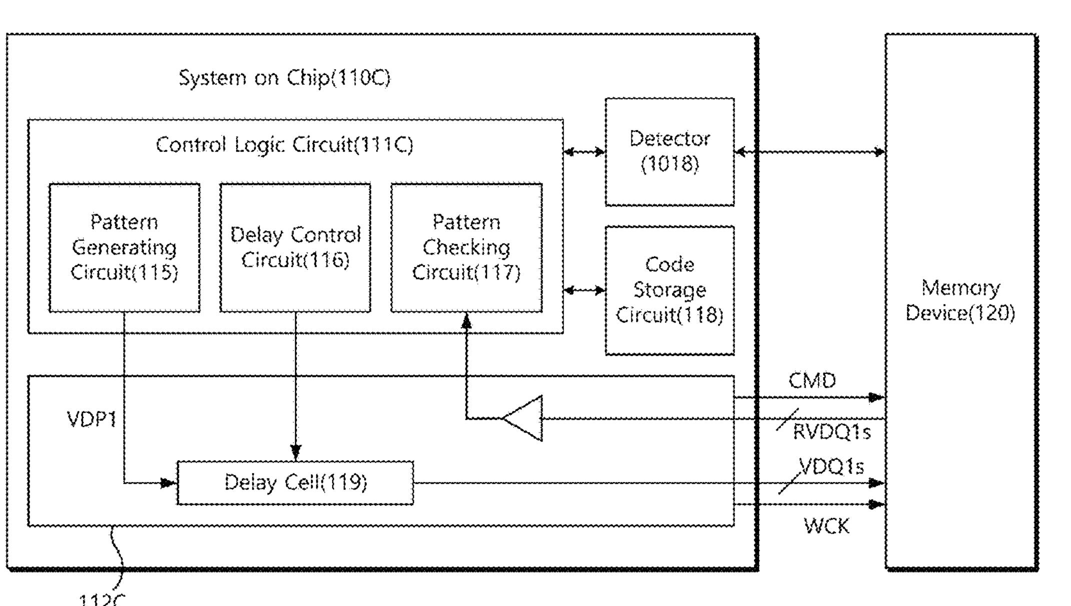

【FIG. 11】
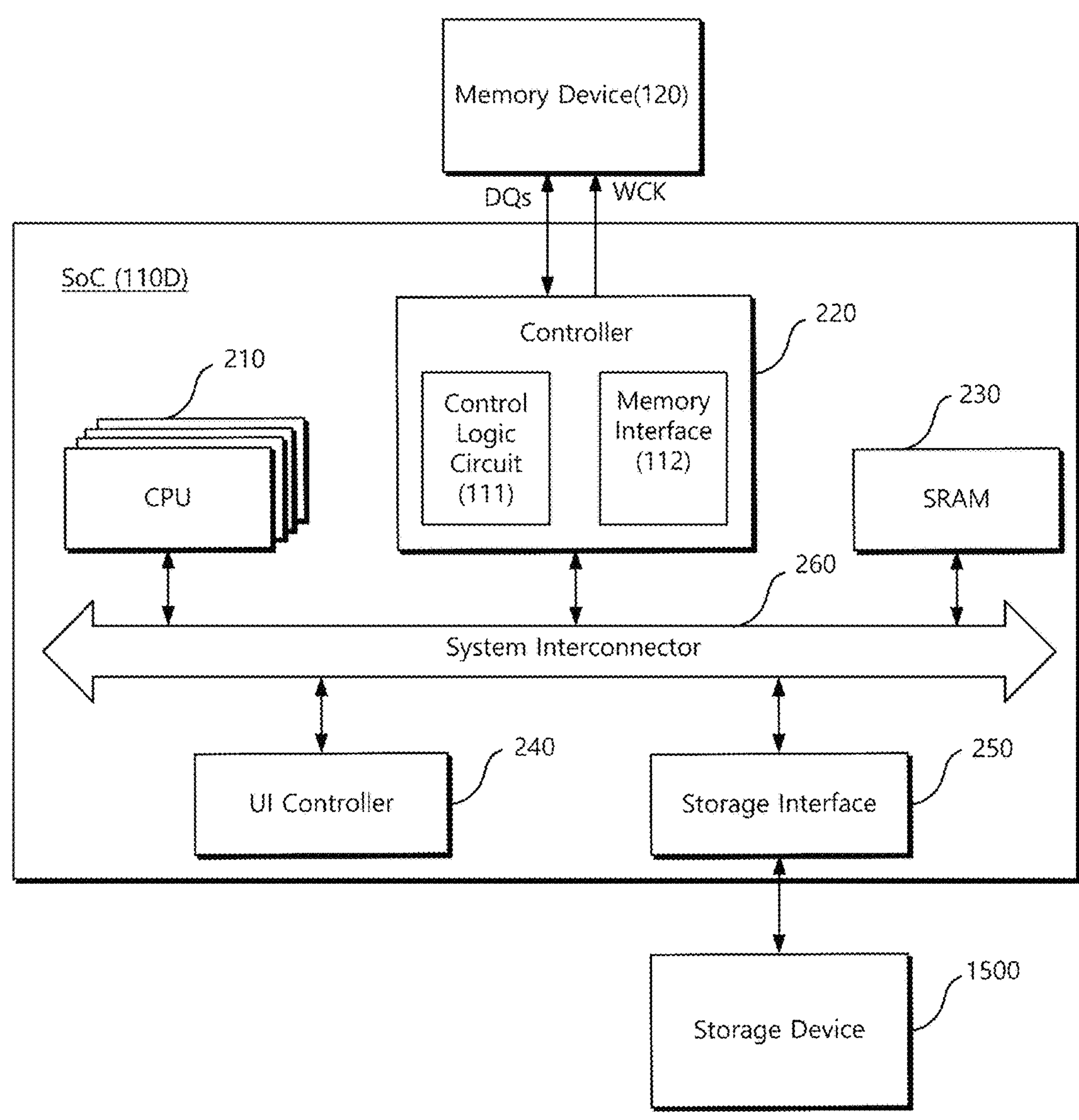

【FIG. 12】
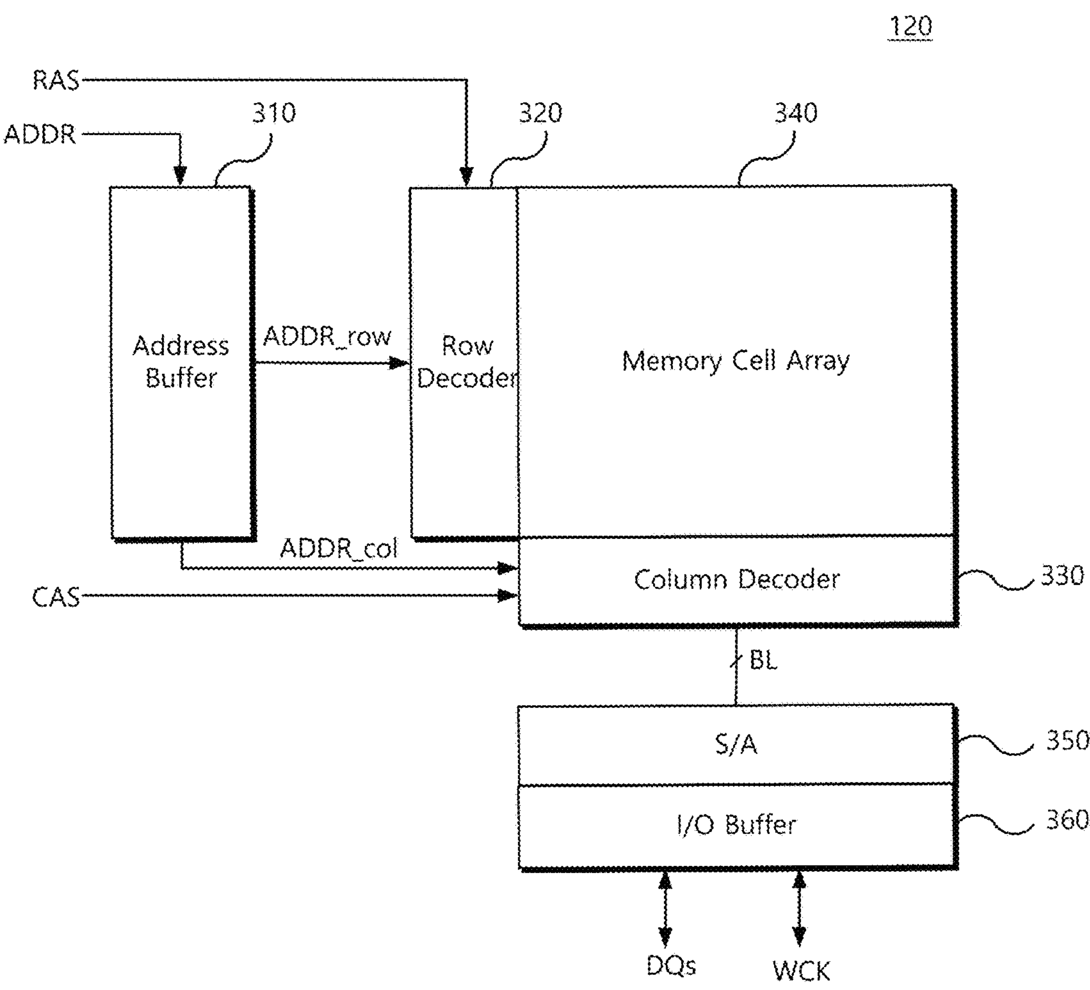

SYSTEM-ON-CHIP FOR CONTROLLING MEMORY DEVICES AND ITS DATA TRAINING METHOD

CROSS-REFERENCE TO RELATED APPLICATIONS

This application claims priority under 35 U.S.C. § 119 to Korean Patent Application No. 10-2024-0011647 filed on Jan. 25, 2024, in the Korean Intellectual Property Office, the disclosure of which is incorporated by reference herein in its entirety.

BACKGROUND

A memory controller or a system-on-chip (SoC) including the same is an integrated circuit in which a plurality of components of an electronic system or a plurality of intellectual properties (IPs) are integrated.

Moreover, the SoC may communicate with a memory device through a high-speed interface.

Here, data transmitted from the SoC to the memory device may be delayed due to internal characteristics of the memory device. Accordingly, the SoC may perform pieces of training on the memory device before communicating with the memory device.

For example, the SoC may perform data training to compensate for delay due to VT variation of the memory device.

However, while the SoC performs training on the memory device, access to the memory device is limited, and thus the performance of the memory system including the memory device may deteriorate.

SUMMARY

Implementations of the present disclosure provide a SoC that reduces a time required to perform data training on a memory device.

According to some implementations, a system-on-Chip (SoC) communicating with a memory device includes a memory interface that exchanges a command and data with the memory device, and a control logic circuit that transmits a clock signal and a plurality of data signals to the memory device through the memory interface. The control logic circuit sequentially transmits pieces of first data with different delay times to the memory device through the memory interface based on a pre-stored first edge code, continuously transmits, to the memory device, a plurality of read commands for reading the pieces of first data stored in the memory device from the memory device, and obtains a first delay value including an extent, to which the pieces of first data are delayed, based on a data pattern of each of pieces of first reception data read from the memory device in response to the plurality of read commands.

According to some implementations, a data training method for a memory device includes sequentially transmitting a plurality of write commands to the memory device so as to have a specified time interval, sequentially transmitting pieces of first data with different delay times to the memory device through a memory interface based on a pre-stored first edge code in response to each of the plurality of write commands, continuously transmitting, to the memory device, a plurality of read commands for reading the pieces of first data stored in the memory device from the memory device, and obtaining a first delay value including an extent, to which the pieces of first data are delayed, based on a data pattern of pieces of first reception data read from the memory device.

According to some implementations, a memory system includes a memory device, and a SoC that controls a memory operation of the memory device. The SoC sequentially transmits pieces of first data with different delay times to the memory device based on a pre-stored first edge code, continuously transmits, to the memory device, a plurality of read commands for reading the pieces of first data stored in the memory device from the memory device, and obtains a first delay value, at which the pieces of first data are delayed in the memory device, based on a data pattern of each of pieces of first reception data read from the memory device.

BRIEF DESCRIPTION OF THE FIGURES

The advantages and features of the present disclosure will become apparent by describing in detail implementations thereof with reference to the accompanying drawings.

FIG. 1 is a block diagram showing a memory system, according to some implementations of the present disclosure.

FIG. 2A is a block diagram showing a configuration of a memory system, according to some implementations.

FIG. 2B shows pieces of first data, to which different delay times are applied, according to some implementations.

FIG. 3A shows commands and data transmitted to a memory device by a SoC, according to some implementations.

FIG. 3B shows commands and data exchanged between a SoC and a memory device, according to some implementations.

FIG. 4 illustrates a configuration for determining a delay value based on a data pattern of data read from a memory device, according to some implementations.

FIG. 5 is a block diagram showing a memory system, according to some implementations.

FIG. 6 shows a configuration in which a SoC determines whether pieces of data transmitted to a memory device through a plurality of transmission paths are delayed, according to some implementations.

FIG. 7 is a flowchart showing a data training method for a memory device, according to some implementations.

FIG. 8 is a flowchart showing a method of controlling the delay of a data signal transmitted to a memory device based on a delay value obtained through data training, according to some implementations.

FIG. 9 is a flowchart showing a method, in which the SoC outputs pieces of first data with different delay times, according to some implementations.

FIG. 10 is a block diagram showing a memory system, according to some implementations.

FIG. 11 is a block diagram showing an example of the SoC of FIG. 1.

FIG. 12 is a block diagram showing an example of the memory device of FIG. 1.

DETAILED DESCRIPTION

Hereinafter, implementations of the present disclosure are described in detail and clearly to such an extent that an ordinary one in the art easily implements the present disclosure.

FIG. 1 is a block diagram showing a memory system, according to some implementations of the present disclosure.

Referring to FIG. 1, a memory system 100 according to some implementations includes a SoC 110 and a memory device 120.

Here, the memory system 100 may refer to a computing device such as an integrated circuit, an electronic device or a system, a smart phone, a tablet personal computer (PC), a computer, a server, a work station, a portable communication terminal, a personal digital assistant (PDA), a portable multimedia player (PMP), and other suitable computers, a virtual machine or a virtual computing device thereof. Alternatively, the memory system 100 may be some of the components included in a computing system, such as a graphics card.

According to some implementations, the memory system 100 includes the memory device 120 that stores data.

Here, the memory device 120 may be a dynamic random access memory (DRAM) such as a double data rate synchronous dynamic random access memory (DDR SDRAM), a low power double data rate (LPDDR) SDRAM, a graphics double data rate (GDDR) SDRAM, a rambus dynamic random access memory (RDRAM), or the like. However, implementations of the present disclosure are not limited thereto. For example, the memory device 120 may include a non-volatile memory such as a flash memory, a magnetic RAM (MRAM), a ferroelectric RAM (FeRAM), a phase change RAM (PRAM), and a resistive RAM (ReRAM).

Moreover, the memory system 100 according to some implementations includes the SoC 110 that exchanges data and/or commands with the memory device 120.

In more detail, the SoC 110 may store data in the memory device 120 by transmitting a command to the memory device 120, or may read data stored in the memory device 120 from the memory device 120.

According to some implementations, the SoC 110 includes a control logic circuit 111 and a memory interface 112.

In more detail, the SoC 110 includes the memory interface 112 that exchanges at least some of a command CMD, data WDATAs and RDATAs, and a clock signal WCK with the memory device 120.

Here, for example, the memory interface 112 may include a double data rate (DDR) physical layer (DDR PHY). Moreover, the memory interface 112 may communicate with the memory device 120 according to the DDR PHY interface (DFI) method.

Furthermore, for example, the memory interface 112 may support features of the DDR and/or Low Power Double Data Rate (LPDDR) protocols of the Joint Electron Device Engineering Council (JEDEC) standard.

According to some implementations, the SoC 110 may control the operation of the memory device 120 through the memory interface 112.

For example, the SoC 110 provides the clock signal WCK and the command CMD to the memory device 120 through the memory interface 112, and may exchange the data WDATAs and RDATAs with the memory device 120. Moreover, the SoC 110 may provide the command CMD and/or exchange the data WDATAs and RDATAs with the memory device 120 in synchronization with the clock signal WCK.

The SoC 110 according to some implementations may receive reception data RDATAs including a plurality of data bits in parallel through a plurality of data lines, or may provide transmission data WDATAs in parallel to the memory device 120. According to some other implementations, the SoC 110 may transmit a data strobe signal to the memory device 120 together with the transmission data WDATAs.

In other words, the SoC 110 may bidirectionally exchange the data WDATAs and RDATAs with the memory device 120. Here, the reception data RDATAs may include read data, and the transmission data WDATAs may include recording data.

According to some other implementations, the memory device 120 may include a high bandwidth memory (HBM) including a plurality of independent channels. When the memory device 120 includes the HBM, the memory interface 112 provided in the SoC 110 may refer to HBM PHY.

Moreover, the SoC 110 may access the memory device 120 in response to a request from a host and may communicate with the host by using various protocols. For example, the SoC 110 may communicate with the host by using interface protocols such as peripheral component interconnect-Express (PCI-E), advanced technology attachment (ATA), serial ATA (SATA), parallel ATA (PATA), or serial attached SCSI (SAS). Besides, various other interface protocols such as universal serial bus (USB), multi-media card (MMC), enhanced small disk interface (ESDI) or integrated drive electronics (IDE) may be applied to a protocol between the host and the SoC 110.

Moreover, the SoC 110 according to some implementations includes the control logic circuit 111 that controls overall operations related to memory operations.

For example, the control logic circuit 111 may execute software (or a program) to control at least one other component (e.g., the memory interface 112) of the SoC 110 and may process and calculate various types of data. The control logic circuit 111 may include a central processing device or microprocessor, and may control the overall operation of the SoC 110. Accordingly, below, the operations performed by the SoC 110 may be understood as being performed under the control of the control logic circuit 111.

According to some implementations, the control logic circuit 111 may include an algorithm for storing data in the memory device 120 or reading data from the memory device 120. For example, the algorithm may be a software code programmed inside the control logic circuit 111. In another example, the algorithm may be a hard code, which is hard-coded inside the control logic circuit 111, but is not limited thereto.

The control logic circuit 111 may perform data training on the memory device 120 according to an algorithm. The control logic circuit 111 may improve the reliability of data exchange with the memory device 120 through the data training on the memory device 120.

In more detail, the control logic circuit 111 may record a training pattern in the memory device 120 under various conditions and may detect a data pattern of the read data. Furthermore, the control logic circuit 111 may adjust an offset value of a delay locked loop (DLL) based on the data pattern of the detected data.

According to some implementations, the control logic circuit 111 may write the pieces of transmission data WDATAs to the memory device 120.

In more detail, the control logic circuit 111 may sequentially transmit a plurality of write commands respectively corresponding to the transmission data WDATAs to the memory device 120 at a specified time interval.

Besides, the control logic circuit 111 may sequentially transmit the pieces of transmission data WDATAs having different delay times to the memory device 120 in response to the plurality of write commands, respectively.

For example, the control logic circuit 111 may sequentially transmit first to fourth write commands to the memory device 120 with a specified time interval.

Furthermore, the control logic circuit 111 may sequentially transmit pieces of first to fourth transmission data to the memory device 120 in response to the first to fourth write commands, respectively.

Here, for example, the time interval in which a plurality of write commands are transmitted may be stored in the storage space inside the memory system 100 or the memory device 120.

In more detail, the control logic circuit 111 may transmit the pieces of transmission data WDATAs with different delay times to the memory device 120 based on a pre-stored first edge code in response to the plurality of write commands, respectively.

The first edge code according to some implementations may refer to a data pattern stored in the storage space inside the memory system 100 or the memory device 120.

The first edge code according to some other implementations may refer to a data pattern obtained through data training previously performed on the memory device 120 by the control logic circuit 111.

Here, for example, in a data training process previously performed on the memory device 120 by the control logic circuit 111, the first edge code may include edge information of pieces of data, which are recorded in the memory device 120 after the rising edge of the clock signal WCK, from among the pieces of transmission data WDATAs.

In another example, in a data training process previously performed on the memory device 120 by the control logic circuit 111, the first edge code may include edge information of pieces of data that match a data pattern of data output from the SoC 110 with a data pattern of data read from the memory device 120.

In still another example, the first edge code may include center information of data output from the SoC 110 and then recorded in the memory device 120.

However, information included in the first edge code is not limited to the examples described above. For example, it may be understood as including various pieces of information about a data signal output from the SoC 110 and then recorded in the memory device 120.

Furthermore, the control logic circuit 111 may continuously transmit read commands for the pieces of transmission data WDATAs stored in the memory device 120.

In more detail, after a specified transition time from a point in time when a plurality of write commands is transmitted, the control logic circuit 111 may continuously transmit read commands for the pieces of transmission data WDATAs stored in the memory device 120.

Here, the transition time may be understood as a time required for the SoC 110 to output a read command after the SoC 110 outputs a write command.

For example, the control logic circuit 111 may continuously transmit read commands for the pieces of transmission data WDATAs stored in the memory device 120 at an interval equal to a data burst length of each read command.

Moreover, the memory device 120 may transmit the stored data to the SoC 110 in response to the read commands continuously transmitted through the memory interface 112.

The control logic circuit 111 may obtain the reception data RDATAs output from the memory device 120 through the memory interface 112.

That is, the control logic circuit 111 may continuously read data stored in the memory device 120 by continuously transmitting read commands through the memory interface 112.

Moreover, the control logic circuit 111 may identify a data pattern of the reception data RDATAs read from the memory device 120.

In more detail, the control logic circuit 111 may compare the data pattern of the transmission data WDATAs output to the memory device 120 with the data pattern of the reception data RDATAs read from the memory device 120.

Furthermore, the control logic circuit 111 may obtain a delay value based on the comparison result between each data pattern of the transmission data WDATAs output to the memory device 120 and each data pattern of the reception data RDATAs read from the memory device 120.

In more detail, the control logic circuit 111 may obtain the delay value based on whether the data pattern of each reception data RDATAs read from the memory device 120 matches the data pattern of each transmission data WDATAs output to the memory device 120.

Here, for example, the delay value may be understood as a value indicating the extent to which the transmission data WDATAs transmitted from the SoC 110 to the memory device 120 is delayed due to changes in characteristics of the memory device 120.

Moreover, for example, the change in the characteristics of the memory device 120 may be understood as a change in temperature or voltage of the memory device 120. Accordingly, the change in the characteristics of the memory device 120 may be referred to as "VT variation", but is not limited thereto.

In another example, the delay value may be understood as a value indicating the extent to which the transmission data WDATAs transmitted from the SoC 110 to the memory device 120 is delayed due to an internal configuration of the memory device 120.

According to some implementations, the delay value may include a delay direction and the amount of time during which the transmission data WDATAs transmitted from the SoC 110 are delayed.

The control logic circuit 111 may store the obtained delay value in a storage space inside the SoC 110 (or the memory system 100).

In more detail, the control logic circuit 111 may store a first update code, which is obtained by reflecting the delay value in the pre-stored first edge code in the storage space inside the SoC 110 (or the memory system 100).

Also, the control logic circuit 111 may control the delay of data transmitted to the memory device 120 by using the first update code.

In more detail, the control logic circuit 111 may compensate for the delay due to the change in characteristics of the memory device 120 for data transmitted to the memory device 120 by using the first update code.

Referring to the above-mentioned configurations, to perform the data training on the memory device 120, the control logic circuit 111 according to some implementations may sequentially transmit a write command for the pieces of transmission data WDATAs so as to have a specified time interval. Subsequently, the control logic circuit 111 may continuously transmit read commands for data stored in the memory device 120.

Furthermore, the control logic circuit 111 may obtain a delay value including the extent, to which the pieces of transmission data WDATAs are delayed, based on the data pattern of the pieces of reception data RDATAs read depending on continuously transmitted read commands.

Here, compared to a case where write commands and read commands are alternately transmitted for data training, the control logic circuit 111 may have a relatively low write delay, a relatively low read delay, and a relatively low transition time.

Here, the write delay may be understood as a time from a point in time when the SoC 110 outputs a write command until data is recorded in the memory device 120. In addition, the read delay may be understood as a time from a point in time when the SoC 110 outputs a read command until data is read from the memory device 120.

In other words, the control logic circuit 111 may continuously output a plurality of write commands and a plurality of read commands for the pieces of transmission data WDATAs, thereby minimizing the delay time caused by a write operation and a read operation.

In this way, the memory system 100 according to some implementations of the present disclosure may reduce the time required for data training on the memory device 120.

FIG. 2A is a block diagram showing a configuration of a memory system, according to some implementations. FIG. 2B shows pieces of first data, to which different delay times are applied, according to some implementations. FIG. 3A shows commands and data transmitted to a memory device by a SoC, according to some implementations. FIG. 3B shows commands and data exchanged between a SoC and a memory device, according to some implementations. FIG. 4 illustrates a configuration for determining a delay value based on a data pattern of data read from a memory device, according to some implementations.

Referring to FIG. 2A, a memory system 100A according to some implementations includes the SoC 110A and a memory device 120. Moreover, the SoC 110A includes a control logic circuit 111A, a code storage circuit 118, and a memory interface 112A.

Here, in FIG. 2A, the code storage circuit 118 is shown as a separate configuration from the control logic circuit 111A and connected to the control logic circuit 111A, but is not limited thereto. According to some other implementations, the code storage circuit 118 may be formed as a part of the control logic circuit 111A.

Moreover, the memory system 100A and the SoC 110A shown in FIG. 2A may be understood as examples of the memory system 100 and the SoC 110 shown in FIG. 1, respectively. Accordingly, the same reference numerals are used for components the same or substantially the same as the above-described components, and descriptions the same as the above-described descriptions are omitted to avoid redundancy.

According to some implementations, the control logic circuit 111A includes a pattern generating circuit 115, a delay control circuit 116, and a pattern checking circuit 117.

However, according to some other implementations, the pattern generating circuit 115, the delay control circuit 116, and the pattern checking circuit 117 may be implemented in a separate configuration from the control logic circuit 111A within the SoC 110A. In this case, each of the pattern generating circuit 115, the delay control circuit 116, and the pattern checking circuit 117 may be connected to the control logic circuit 111A and may be controlled by the control logic circuit 111A.

The control logic circuit 111A includes the pattern generating circuit 115 that generates a first data pattern DP1.

According to some implementations, the pattern generating circuit 115 may generate the first data pattern DP1 in response to the first creation command generated depending on a specified period. Here, the control logic circuit 111A may generate a first generation command for performing data training on the memory device 120 depending on the specified period.

In more detail, the pattern generating circuit 115 may generate the first data pattern DP1 based on the pre-stored first edge code in response to the first generation command generated depending on the specified period.

Moreover, the control logic circuit 111A includes the delay control circuit 116 that generates the pieces of first data WDATA1*s* by applying different delay times to the first data pattern DP1.

The memory interface 112A according to some implementations includes a delay cell 119. In more detail, the memory interface 112A includes the delay cell 119 connected to the pattern generating circuit 115 and the delay control circuit 116.

The delay control circuit 116 according to some implementations may apply different delay times to the first data pattern DP1 through the delay cell 119.

In more detail, the delay control circuit 116 may control the delay cell 119 such that the memory interface 112A outputs the pieces of first data WDATA1*s* with different delay times applied to the first data pattern DP1.

Referring to FIGS. 2A and 2B together, the delay control circuit 116 may apply a delay time, which is equal to an integer multiple of a unit delay time tD, to the first data pattern DP1 through the delay cell 119.

The memory interface 112A may output the pieces of first data WDATA1*s* with a delay time corresponding to a different integer multiple of the unit delay time tD applied to the first data pattern DP1.

For example, the delay control circuit 116 may output 1-1st data WDATA0 advanced from the first data pattern DP1 by twice the unit delay time tD. Moreover, the delay control circuit 116 may output 1-2nd data WDATA1 advanced from the first data pattern DP1 by the unit delay time tD. Moreover, the delay control circuit 116 may output 1-3rd data WDATA2 with the same pattern as the first data pattern DP1.

Moreover, the delay control circuit 116 may output 1-4th data WDATA3 delayed from the first data pattern DP1 by the unit delay time tD. Moreover, the delay control circuit 116 may output 1-5th data WDATA4 delayed from the first data pattern DP1 by twice the unit delay time tD.

Here, the amount of the unit delay time tD and/or the number of first data WDATA1*s* output with different delay times applied may be stored in the internal storage space of the memory system 100A (or the SoC 110A).

However, the amount of the unit delay time tD and/or the number of first data WDATA1*s* output by the SoC 110A with different delay times applied is not limited to the examples described above.

Referring to FIGS. 2A, 3A and 3B together, the SoC 110A according to some implementations may transmit, to the memory device 120, a plurality of write commands WR1 to WR5 for recording the pieces of first data WDATA0 to WDATA4, respectively.

In more detail, the SoC 110A may sequentially transmit the plurality of write commands WR1 to WR5 for recording the pieces of first data WDATA0 to WDATA4 to the memory device 120 so as to have a specified time interval D1.

For example, after the specified time interval D1 from a point in time when the first write command WR1 was transmitted to the memory device 120, the SoC 110A may transmit the second write command WR2 to the memory device 120.

Here, the first write command WR1 may be understood as a command that allows the SoC 110A to write the 1-1st data WDATA0 to the memory device 120. Moreover, the second write command WR2 may be understood as a command for writing the 1-2nd data WDATA1 to the memory device 120.

Here, for example, the specified time interval D1 may be understood as a time obtained by adding a time equal to a data burst length of each write command to a time required to apply a delay time to each data.

Moreover, the SoC 110A may transmit the pieces of first data WDATA0 to WDATA4 to the memory device 120 in response to the plurality of write commands WR1 to WR5, respectively.

In more detail, the SoC 110A may sequentially transmit the pieces of first data WDATA0 to WDATA4 to the memory device 120 in response to the plurality of write commands WR1 to WR5 sequentially transmitted to the memory device 120, respectively.

In this way, the SoC 110A may sequentially record the pieces of first data WDATA0 to WDATA4 to the memory device 120.

According to some implementations, after a time has elapsed by a write delay WL from a point in time when the first write command WR1 is output, the SoC 110A may record the 1-1st data WDATA0 to the memory device 120.

Here, the write delay WL may refer to a time until the 1-1st data WDATA0 corresponding to the first write command WR1 is written to the memory device 120 after the first write command WR1 among the plurality of write commands WR1 to WR5 is transmitted. Referring to the above-mentioned configurations, the SoC 110A may have the relatively small write delay WL by sequentially outputting the plurality of write commands WR1 to WR5, compared to a case where write commands and read commands for the pieces of first data WDATA0 to WDATA4 are output alternately.

In this way, the memory system 100A according to some implementations of the present disclosure may minimize the time required for data training on the memory device 120.

Moreover, after a transition time WTR from a point in time when the plurality of write commands WR1 to WR5 are output, the SoC 110A may transmit, to the memory device 120, a plurality of read commands RD1 to RD5 for reading data stored in the memory device 120.

Here, the transition time WTR may be understood as a time required for the SoC 110A to output a read command (e.g., the first read command RD1) after the SoC 110A outputs a write command (e.g., the fifth write command WR5).

In more detail, the SoC 110A may continuously transmit, to the memory device 120, the plurality of read commands RD1 to RD5 for reading data stored in the memory device 120.

For example, the SoC 110A may continuously transmit, to the memory device 120, the plurality of read commands RD1 to RD5 with a time interval equal to a burst length D2.

Here, the burst length D2 may be understood as corresponding to a time during which the read command output by the SoC 110A is transmitted to the memory device 120.

For example, the SoC 110A may transmit the first read command RD1 to the memory device 120 and then may transmit the second read command RD2 to the memory device 120.

According to some implementations, the SoC 110A may receive the pieces of first reception data RDATA1*s*, which are output from the memory device 120, in response to the plurality of read commands RD1 to RD5.

In more detail, the SoC 110A may receive the pieces of first reception data RDATA1*s*, which are continuously output from the memory device 120, in response to the plurality of read commands RD1 to RD5.

In other words, the SoC 110A may continuously read the pieces of first reception data RDATA1*s* from the memory device 120 by transmitting the plurality of read commands RD1 to RD5 to the memory device 120.

In more detail, the SoC 110A may continuously read the pieces of first reception data RDATA1*s* from the memory device 120 in response to the plurality of read commands RD1 to RD5 continuously output to the memory device 120.

According to some implementations, after a time corresponding to a read delay RL has elapsed from a point in time when the first read command RD1 is output, the SoC 110A may read the 1-1st reception data RDATA0 from the memory device 120.

Here, the read delay RL may refer to a time until the 1-1st reception data RDATA0 corresponding to the first read command RD1 is read from the memory device 120 after the first read command RD1 among the plurality of read commands RD1 to RD5 is transmitted.

Referring to the above-mentioned configurations, the SoC 110A may have the relatively small read delay RL by continuously outputting the plurality of read commands RD1 to RD5, compared to a case where write commands and read commands for the pieces of first data WDATA0 to WDATA4 are output alternately.

Also, the SoC 110A may sequentially transmit the plurality of write commands WR1 to WR5 to the memory device 120, and then continuously transmit the plurality of read commands RD1 to RD5.

In this case, compared to a case of alternately outputting a write command and a read command for each of the piece of first data WDATA0 to WDATA0, the SoC 110A may have a relatively small transition time WTR.

Through the above-mentioned configurations, the memory system 100A according to some implementations of the present disclosure may minimize the time required for data training on the memory device 120.

Moreover, the control logic circuit 111A includes the pattern checking circuit 117 that identifies the data pattern of the pieces of first reception data RDATA1*s* read from the memory device 120.

According to some implementations, the pattern checking circuit 117 may check the data pattern of data read from the memory device 120. In more detail, the pattern checking circuit 117 may identify the data pattern of each of the pieces of first reception data RDATA1*s* read from the memory device 120.

Furthermore, the pattern checking circuit 117 may compare the data pattern of each of the pieces of first reception data RDATA1*s* with the data pattern of each of the pieces of first data WDATA1*s*.

In more detail, the pattern checking circuit 117 may determine whether the data pattern of each of the pieces of first reception data RDATA1*s* matches the data pattern of each of the pieces of first data WDATA1*s*.

Here, the pattern checking circuit 117 may continuously compare the data pattern of each of the pieces of first reception data RDATA1*s*, which are continuously read, with the data pattern of the corresponding data among the pieces of first data WDATA1*s*.

For example, the pattern checking circuit 117 may determine whether the data pattern of the 1-1st reception data RDATA0 matches the data pattern of the 1-1st data WDATA0.

In other words, the pattern checking circuit 117 may perform a first determination operation DQC1 of determining whether the data pattern of the 1-1st reception data RDATA0 matches the data pattern of the 1-1st data WDATA0.

Moreover, the pattern checking circuit 117 may determine whether the data pattern of the 1-2nd reception data RDATA1 matches the data pattern of the 1-2nd data WDATA1.

That is, the pattern checking circuit 117 may perform a second determination operation DQC2 of determining whether the data pattern of the 1-2nd reception data RDATA1 matches the data pattern of the 1-2nd data WDATA1.

The pattern checking circuit 117 may continuously perform the first to fifth determination operations DQC1 to DQC5 of determining whether the data pattern of each of the pieces of first reception data RDATA1*s* matches the data pattern of the corresponding data among the pieces of first data WDATA1*s*.

Moreover, the control logic circuit 111A (or the delay control circuit 116) may determine the first delay value DL1, which includes the extent to which a data signal transmitted to the memory device 120 is delayed, based on whether the data pattern of each of the pieces of first reception data RDATA1*s* matches the data pattern of the corresponding data among the pieces of first data WDATA1*s*.

Here, the first delay value DL1 may include at least some of the amount of time during which the data signal transmitted to the memory device 120 is delayed, and a delay direction.

The delay control circuit 116 may determine whether each of the pieces of first data WDATA1*s* has been written to the memory device 120 after the rising edge of the clock signal WCK, based on the comparison result obtained through the pattern checking circuit 117.

Moreover, the delay control circuit 116 may determine the first delay value DL1, which includes the extent, to which data transmitted to the memory device 120 is delayed, based on whether each of the pieces of first data WDATA1*s* was written to the memory device 120 after the rising edge of the clock signal WCK.

The SoC 110A according to some implementations may record data to the memory device 120 in synchronization with the clock signal WCK having a high level.

That is, in the data recorded after the rising edge of the clock signal WCK, the data pattern of the data output from the SoC 110A may match the data pattern of the data read from the memory device 120.

Accordingly, when the data output to be written to the memory device 120 and the data read from the memory device 120 have the same data pattern, the delay control circuit 116 may determine that the data is written to the memory device 120 after the rising edge of the clock signal WCK.

On the other hand, when the data output to be written to the memory device 120 and the data read from the memory device 120 have different data patterns from each other, the delay control circuit 116 may determine that the data is written to the memory device 120 before the rising edge of the clock signal WCK.

Furthermore, the delay control circuit 116 may determine the first delay value DL1 based on at least some of the number, placement, and order of data whose data pattern of each of the pieces of first reception data RDATA1*s* matches the corresponding data pattern of each of the pieces of first data WDATA1*s*.

In more detail, the delay control circuit 116 may determine whether at least some of the number, placement, and order of data whose data pattern of each of the pieces of first reception data RDATA1*s* matches the corresponding data pattern of each of the pieces of first data WDATA1*s* are changed due to changes in the characteristics of the memory device 120.

In other words, the delay control circuit 116 may determine whether the matching between the data pattern of each of the pieces of first reception data RDATA1*s* and the data pattern of the corresponding data among the pieces of first data WDATA1*s* is changed due to changes in the characteristics of the memory device 120.

For example, referring to FIG. 4, when the clock signal WCK is not advanced due to changes in the characteristics of the memory device 120, at least part of the 1-2nd data WDATA1 may be transmitted to the memory device 120 before the rising edge of the clock signal WCK.

In this case, at least some of the 1-2nd data WDATA1 may not be written to the memory device 120 in synchronization with the clock signal WCK of a level signal. Accordingly, the delay control circuit 116 may determine that data patterns of the 1-2nd data WDATA1 and the 1-2nd reception data RDATA1 do not match each other.

On the other hand, when the clock signal WCK is advanced due to changes in the characteristics of the memory device 120, the 1-2nd data WDATA1 may be transmitted to the memory device 120 after the rising edge of the clock signal WCK.

In this case, the data pattern of the 1-2nd data WDATA1 output from the SoC 110A may be written to the memory device 120 in synchronization with the clock signal WCK of a high level. Accordingly, the delay control circuit 116 may determine that data patterns of the 1-2nd data WDATA1 and the 1-2nd reception data RDATA1 match each other.

In this way, the delay control circuit 116 may determine that the clock signal WCK is advanced by the first delay value DL1 due to a change in the characteristics of the memory device 120.

However, FIG. 4 shows that the clock signal WCK is advanced by the first delay value DL1 due to a change in the characteristics of the memory device 120, but implementations are not limited thereto.

For example, through the above-mentioned configurations, the delay control circuit 116 may determine that the data signal transmitted from the SoC 110A to the memory device 120 is delayed by the first delay value DL1.

In another example, through the above-mentioned configurations, the delay control circuit 116 may determine that a data strobe signal transmitted from the SoC 110A to the memory device 120 together with the data signal is delayed by the first delay value DL1.

That is, the delay control circuit 116 (or the control logic circuit 111A) may determine the delay that occurs in the data or the clock signal WCK due to a change in the characteristics of the memory device 120, by comparing the data pattern of each of the pieces of first reception data RDATA1*s* with the data pattern of each of the pieces of first data WDATA1*s*.

Moreover, the control logic circuit 111A may generate a first update code obtained by reflecting the first delay value DL1 to the pre-stored first edge code.

In more detail, the control logic circuit 111A may generate the first update code, which is obtained by reflecting the first delay value DL1 to the pre-stored first edge code, and may store the first update code in the code storage circuit 118.

Here, the first edge code according to some implementations may refer to a data pattern of a first bit obtained through data training previously performed on the memory device 120 by the control logic circuit 111A.

Besides, for example, in a data training process previously performed on the first bit, which is obtained through data training previously performed on the memory device 120, by the control logic circuit 111A, the first edge code may include edge information of pieces of data, which are written to the memory device 120 after the rising edge of the clock signal WCK, from among the pieces of first data WDATA1*s*.

For example, the control logic circuit 111A may store the first update code, which is obtained by reflecting the first delay value DL1 to the first edge code stored in the code storage circuit 118, in the code storage circuit 118 in response to obtaining the first delay value DL1.

Furthermore, the control logic circuit 111A (or the delay control circuit 116) according to some implementations may control the delay of a data signal transmitted to the memory device 120 based on the first update code stored in the code storage circuit 118.

The control logic circuit 111A according to some other implementations may control the delay of the clock signal WCK, which is transmitted to the memory device 120, based on the first update code stored in the code storage circuit 118.

Referring to the above-mentioned configurations, the SoC 110A according to some implementations may sequentially transmit the plurality of write commands WR1 to WR5 for the pieces of first data WDATA1*s* to the memory device 120, and then may sequentially transmit the plurality of read commands RD1 to RD5.

Furthermore, the SoC 110A may sequentially identify the data pattern of the pieces of first reception data RDATA1*s* read in response to the plurality of read commands RD1 to RD5 transmitted continuously and may compare the identified data pattern with the data pattern of the corresponding pieces of first data WDATA1*s*.

Moreover, the SoC 110A may determine the first delay value DL1 including the extent, to which the data signal transmitted from the SoC 110A to the memory device 120 is delayed, based on the comparison result.

In this case, the SoC 110A may determine the delay value within a relatively short time, compared to the case that the SoC 110A alternately outputs a write command and a read command for each of the pieces of first data WDATA0 to WDATA4 and determines a delay value depending on the data pattern of data read depending on each read command.

Through the above-mentioned configurations, the memory system 100A according to some implementations of the present disclosure may minimize the time required for data training on the memory device 120.

FIG. 5 is a block diagram showing a memory system, according to some implementations. FIG. 6 shows a configuration in which a SoC determines whether pieces of data transmitted to a memory device through a plurality of transmission paths are delayed, according to some implementations.

Referring to FIGS. 5 and 6 together, a SoC 110B according to some implementations may perform data training of the memory device 120 on each data bit, by using data transmitted to the memory device 120 through a plurality of transmission paths 1520.

Here, a memory system 100B and the SoC 110B shown in FIG. 5 may be understood as examples of the memory system 100 and the SoC 110 shown in FIG. 1, respectively. Accordingly, the same reference numerals are used for components the same or substantially the same as the above-described components, and descriptions the same as the above-described descriptions are omitted to avoid redundancy.

According to some implementations, the pattern generating circuit 115 may generate a data pattern corresponding to each of a plurality of data bits.

For example, the pattern generating circuit 115 may generate the first data pattern DP1 corresponding to a first bit. Moreover, the pattern generating circuit 115 may generate a second data pattern DP2 corresponding to a second bit.

According to some implementations, a memory interface 112B includes a plurality of delay cells 510 respectively connected to the plurality of transmission paths 1520.

In more detail, the memory interface 112B includes the plurality of delay cells 510 that apply different delay times to data patterns generated from the pattern generating circuit 115.

According to some implementations, the delay control circuit 116 may generate pieces of data DQ[0] to DQ[n−1], which is obtained by applying different delay times to the data patterns generated from the pattern generating circuit 115, by using the plurality of delay cells 510.

For example, the delay control circuit 116 may generate the pieces of first data DQ[0] with different delay times applied to the first data pattern DP1 generated in response to the first bit from the pattern generating circuit 115, by using a first delay cell DLC1.

Here, for example, the pieces of first data DQ[0] may be understood as being substantially the same as the pieces of first data WDATA1*s* shown in FIG. 2A.

Moreover, for example, the delay control circuit 116 may generate the pieces of second data DQ[1] with different delay times applied to the second data pattern generated in response to the second bit from the pattern generating circuit 115, by using a second delay cell DLC2.

Moreover, according to some implementations, the SoC 110B may sequentially transmit a plurality of write commands for the pieces of data DQ[0] to DQ[n−1], which are generated to correspond to each bit to the memory device 120, so as to have a specified time interval.

For example, the SoC 110B may sequentially transmit a plurality of write commands for the pieces of first data DQ[0], which are generated in response to the first bit to the memory device 120, so as to have a specified time interval.

Here, an operation in which the SoC 110B transmits a plurality of write commands respectively corresponding to the pieces of data DQ[0] to DQ[n−1] to the memory device 120 may be understood as being substantially the same as an operation in which the SoC 110A sequentially transmits a plurality of write commands in FIG. 3A.

Moreover, the SoC 110B may sequentially transmit the pieces of data DQ[0] to DQ[n−1] to the memory device 120 through at least some of the plurality of transmission paths 1520, in response to a plurality of write commands.

For example, the SoC 110B may sequentially transmit the pieces of first data DQ[0] to the memory device 120 through at least some of the plurality of transmission paths 1520 in response to a plurality of first write commands.

Moreover, the SoC 110B may sequentially transmit the pieces of second data DQ[1] to the memory device 120 through at least some of the plurality of transmission paths 1520 in response to a plurality of second write commands.

Here, after a time corresponding to a write delay (e.g., WL) has elapsed from a point in time when the first write command for each bit is output, the SoC 110B may record data corresponding to the first write command to the memory device 120.

Referring to the above-mentioned configurations, the SoC 110B may sequentially output a plurality of write commands for pieces of data generated to correspond to each bit. Here, the SoC 110B may have a relatively small write delay compared to a case where a write command and a read command for each of the pieces of data DQ[0] to DQ[n−1] output to correspond to each bit are output alternately.

In this way, the memory system 100B according to some implementations of the present disclosure may minimize the time required for data training on the memory device 120.

Moreover, after the transition time WTR from when write commands for pieces of data corresponding to each bit are output, the SoC 110A may transmit, to the memory device 120, a plurality of read commands for reading data stored in the memory device 120.

Here, the transition time WTR may be understood as a time required for the SoC 110B to output a write command after a read command is output.

In more detail, the SoC 110B may continuously transmit, to the memory device 120, the plurality of read commands for reading data stored in the memory device 120.

Here, an operation in which the SoC 110B continuously transmits a plurality of read commands to the memory device 120 may be understood as being substantially the same as an operation in which the SoC 110A continuously transmits a plurality of read commands in FIG. 3A.

According to some implementations, the SoC 110B may receive pieces of reception data RDQ[0] to RDQ[n−1] from the memory device 120 through at least some of the plurality of reception paths 1530 in response to a plurality of read commands.

In other words, the SoC 110B may read the pieces of reception data RDQ[0] to RDQ[n−1] from the memory device 120 through at least some of the plurality of reception paths 1530 by transmitting a plurality of read commands for pieces of data stored in the memory device 120 to the memory device 120 to correspond to each bit.

For example, the SoC 110B may continuously read the pieces of first reception data RDQ[0] from the memory device 120 in response to a plurality of first read commands output to the memory device 120.

Here, according to some implementations, the plurality of transmission paths 1520 and the plurality of reception paths 1530 may be configured (or implemented) as one transmission line.

According to some implementations, after a time corresponding to a read delay (e.g., RL) has elapsed from a point in time when the first read command for each bit is output, the SoC 110B may read data corresponding to the first read command from the memory device 120.

Referring to the above-mentioned configurations, the SoC 110B may sequentially output a plurality of read commands for pieces of data generated to correspond to each bit.

Here, the SoC 110B may have a relatively small read delay compared to a case where a write command and a read command for each of the pieces of data DQ[0] to DQ[n−1] output to correspond to each bit are output alternately.

Also, the SoC 110B may sequentially transmit a plurality of write commands for pieces of data generated to correspond to each bit, and then may continuously transmit a plurality of read commands.

In this case, the SoC 110B may have a relatively small transition time WTR compared to the case where a write command and a read command for each of pieces of data generated to correspond to each bit are output alternately.

Through the above-mentioned configurations, the memory system 100B according to some implementations of the present disclosure may minimize the time required for data training on the memory device 120.

According to some implementations, the pattern checking circuit 117 may check the data pattern of data read from the memory device 120. In more detail, the pattern checking circuit 117 may identify the data pattern of each of the pieces of reception data RDQ[0] to RDQ[n−1] read from the memory device 120.

Furthermore, the pattern checking circuit 117 may compare the data pattern of each of the pieces of reception data RDQ[0] to RDQ[n−1] with the data pattern of each of the pieces of data DQ[0] to DQ[n−1].

For example, the pattern checking circuit 117 may determine whether the data pattern of each of the pieces of first reception data RDQ[0] matches the data pattern of the corresponding data among the pieces of first data DQ[0].

The pattern checking circuit 117 may continuously compare the data pattern of each of the pieces of first reception data RDQ[0], which are continuously read, with the data pattern of the corresponding data among the pieces of first reception data DQ[0].

Here, an operation in which the pattern checking circuit 117 compares the data pattern of each of the pieces of reception data RDQ[0] to RDQ[n−1] with the data pattern of each of the pieces of data DQ[0] to DQ[n−1] may be understood as substantially the same as an operation in which the pattern checking circuit 117 continuously compares the data pattern of each of the pieces of first reception data RDQ[0] with the data pattern of each of the pieces of first data DQ[0] in FIG. 3A.

In other words, the pattern checking circuit 117 may read pieces of data written to the memory device 120 in response to each data bit and then may compare the data pattern of the data output to the memory device 120 with the data pattern of the read data.

Moreover, the delay control circuit 116 may determine a delay value DL including the extent to which data of each bit transmitted to the memory device 120 is delayed based on whether the data pattern of each of the pieces of reception data RDQ[0] to RDQ[n−1] matches the data pattern of each of the pieces of data DQ[0] to DQ[n−1].

Here, the delay value DL may include at least some of the amount of time during which data transmitted to the memory device 120 is delayed, and a delay direction.

According to some implementations, in the data recorded after the rising edge of the clock signal WCK, the data pattern of the data output from the SoC 110B may match the data pattern of the data read from the memory device 120.

In other words, when the data output to be written to the memory device 120 and the data read from the memory device 120 have the same data pattern, the delay control circuit 116 may determine that the data is recorded in the memory device 120 after the rising edge of the clock signal WCK.

In more detail, the delay control circuit 116 may determine whether at least some of data continuously output to correspond to each bit is recorded in the memory device 120 after the rising edge of the clock signal WCK, based on the comparison result obtained through the pattern checking circuit 117.

Moreover, the delay control circuit 116 may determine the delay value DL including the extent, to which data transmitted to the memory device 120 is delayed in each of the pieces of data DQ[0] to DQ[n−1] corresponding to each bit, based on whether at least part of data is recorded in the memory device 120 after the rising edge of the clock signal WCK.

Furthermore, the delay control circuit 116 may determine the delay value DL based on at least some of the number, placement, and order of data whose data pattern of each of the pieces of reception data RDQ[0] to RDQ[n−1] matches the corresponding data pattern of each of the pieces of data DQ[0] to DQ[n−1].

In more detail, the delay control circuit 116 may determine whether at least some of the number, placement, and order of data whose data pattern of each of the pieces of reception data RDQ[0] to RDQ[n−1] matches the corresponding data pattern of each of the pieces of data DQ[0] to DQ[n−1] are changed due to changes in the characteristics of the memory device 120.

In other words, the delay control circuit 116 may determine whether the matching between the data pattern of each of the piece of reception data RDQ[0] to RDQ[n−1] and the data pattern of the corresponding data among the pieces of data DQ[0] to DQ[n−1] is changed due to changes in the characteristics of the memory device 120.

For example, referring to FIG. 6, when the clock signal WCK is not advanced due to changes in the characteristics of the memory device 120, the 1-2nd data DQ12 may be transmitted to the memory device 120 before the rising edge of the clock signal WCK.

In this case, the data pattern of the 1-3rd data DQ13, which follows the 1-2nd data DQ12 and which is output from the SoC 110B, may be recorded in the memory device 120 in synchronization with the clock signal WCK of a high level. Accordingly, the delay control circuit 116 may determine that the data pattern of the 1-2nd data DQ12 does not match the data pattern of the 1-2nd reception data RDQ12 among the pieces of first reception data RDQ[0].

On the other hand, when the clock signal WCK is advanced due to changes in the characteristics of the memory device 120, at least part of the 1-2nd data DQ12 may be transmitted to the memory device 120 after the rising edge of the clock signal WCK.

In this case, the data pattern of the 1-2nd data DQ12 output from the SoC 110B may be written to the memory device 120 in synchronization with the clock signal WCK of a high level. Accordingly, the delay control circuit 116 may determine that data patterns of the 1-2nd data DQ12 and the 1-2nd reception data RDQ12 match each other.

In this way, the delay control circuit 116 may determine that the clock signal WCK is advanced by the delay value DL due to a change in the characteristics of the memory device 120.

However, FIG. 6 shows that the clock signal WCK is advanced by the delay value DL due to a change in the characteristics of the memory device 120, but implementations are not limited thereto.

According to some implementations, through the above-mentioned configurations, the delay control circuit 116 may determine that data signals of the pieces of first data DQ11 to DQ15 output from the SoC 110B in response to the first bit is delayed by the delay value DL.

In more detail, the delay control circuit 116 may determine that the data signals of the pieces of first data DQ[0] output from the SoC 110B is delayed by the unit delay value, based on the fact that the matching of the data pattern between one reception data and the corresponding data is changed.

According to some other implementations, through the above-mentioned configurations, the delay control circuit 116 may determine that a data strobe signal transmitted from the SoC 110B to the memory device 120 together with the data signal is delayed by the delay value DL.

In another example, when the clock signal WCK is not advanced due to changes in the characteristics of the memory device 120, at least part of the 2-2nd data DQ22 may be transmitted to the memory device 120 after the rising edge of the clock signal WCK.

In addition, even when the clock signal WCK is advanced due to changes in the characteristics of the memory device 120, at least part of the 2-2nd data DQ22 may be transmitted to the memory device 120 after the rising edge of the clock signal WCK.

In this case, the data pattern of the 2-2nd data DQ22 output from the SoC 110B may be written to the memory device 120 in synchronization with the clock signal WCK of a high level. Accordingly, the delay control circuit 116 may determine that the data pattern of the 2-2nd data DQ22 matches the data pattern of the 2-2nd reception data RDQ22 among the pieces of first reception data RDQ[1].

In other words, even when the characteristics of the memory device 120 are changed, the pieces of second data DQ21 to DQ25 output in response to a second bit may maintain whether the data patterns of the recorded data matches the data patterns of the read data.

In this case, the delay control circuit 116 may determine that no delay occurs in the data signal output in response to the second bit. Furthermore, in a data training process for the memory device 120, the delay control circuit 116 may omit delay compensation for the data signal output in response to the second bit.

In yet another example, when the clock signal WCK is not advanced due to changes in the characteristics of the memory device 120, the 3-2nd data DQ32 and the 3-3rd data DQ33 may be transmitted to the memory device 120 before the rising edge of the clock signal WCK.

In this case, the data pattern of the 3-4th data DQ34, which follows the 3-2nd data DQ32 and the 3-3rd data DQ33 and which is output from the SoC 110B, may be recorded in the memory device 120 in synchronization with the clock signal WCK of a high level. Accordingly, the delay control circuit 116 may determine that the data pattern of each of the 3-2nd data DQ32 and the 3-3rd data DQ33 does not match the data pattern of each of the data pattern of the 3-2nd reception data RDQ32 and the 3-3rd reception data RDQ33 among the third pieces of reception data RDQ[2].

On the other hand, when the clock signal WCK is advanced due to changes in the characteristics of the memory device 120, at least part of the 3-2nd data DQ32 and the 3-3rd data DQ33 may be transmitted to the memory device 120 after the rising edge of the clock signal WCK.

In this case, the data pattern of the 3-2nd data DQ32 and the 3-3rd data DQ33 output from the SoC 110B may be written to the memory device 120 in synchronization with the clock signal WCK of a high level. Accordingly, the delay control circuit 116 may determine that the data pattern of each of the 3-2nd data DQ32 and the 3-3rd data DQ33 matches the data pattern of each of the 3-2nd reception data RDQ32 and the 3-3rd reception data RDQ33.

In this way, the delay control circuit 116 may determine that the clock signal WCK is advanced by the delay value DL due to a change in the characteristics of the memory device 120.

According to some implementations, through the above-mentioned configurations, the delay control circuit 116 may determine that data signals of the pieces of third data DQ31 to DQ35 output from the SoC 110B in response to a third bit is delayed by the delay value DL.

In more detail, the delay control circuit 116 may determine that the data signals of the pieces of third data DQ[2] output from the SoC 110B is delayed by twice the unit delay value, based on the fact that the matching of the data pattern between two pieces of reception data and the corresponding pieces of data is changed.

In other words, the delay control circuit 116 may determine the delay occurring in each data due to changes in the characteristics of the memory device 120 by comparing the data pattern of each of the pieces of reception data RDQ[0] to RDQ[n−1], which correspond to each bit, with the data pattern of each of the corresponding pieces of data DQ[0] to DQ[n−1].

Moreover, the control logic circuit 111B may generate an update code obtained by reflecting the delay value DL determined for each of the pre-stored edge codes to correspond to each bit.

For example, the control logic circuit 111B may generate a first update code, which is obtained by reflecting the first delay value DL1 determined through the pieces of first data DQ11 to DQ15 to the pre-stored first edge code, in response to the first bit and may store the first update code in the code storage circuit 118.

In another example, the control logic circuit 111B may generate a second update code, which is obtained by reflecting the second delay value DL2 determined through the pieces of second data DQ21 to DQ25 to a pre-stored second edge code, in response to the second bit and may store the second update code in the code storage circuit 118.

Furthermore, the control logic circuit 111B (or the delay control circuit 116) may control the delay of the data signal transmitted to the memory device 120 based on each of the update codes stored in the code storage circuit 118 to correspond to each bit.

For example, the control logic circuit 111B may control delay of a data signal of the first bit, which is transmitted to the memory device 120, based on the first update code stored in the code storage circuit 118 to correspond to the first bit.

Referring to the above-mentioned configurations, the SoC 110B according to some implementations may sequentially transmit a plurality of write commands for the pieces of data DQ[0] to DQ[n−1] to the memory device 120, and then may continuously transmit a plurality of read commands.

Furthermore, the SoC 110B may sequentially identify the data pattern of each of the pieces of reception data RDQ[0] to RDQ[n−1] read depending on a plurality of read commands, which are continuously transmitted, and may compare the data pattern of each of the pieces of reception data RDQ[0] to RDQ[n−1] with the data pattern of each of the pieces of data DQ[0] to DQ[n−1] corresponding to the reception data.

Moreover, the SoC 110B may determine the delay value DL including the extent, to which data transmitted from the SoC 110B to the memory device 120 is delayed, based on the comparison result.

In this case, the SoC 110B may determine the delay value DL within a relatively short time, compared to the case that the SoC 110B alternately output a write command and a read command for each of the pieces of data DQ[0] to DQ[n−1] corresponding to each bit and determines a delay value depending on the data pattern of data read according to each read command.

Through the above-mentioned configurations, the memory system 100B according to some implementations of the present disclosure may minimize the time required for data training on the memory device 120.

FIG. 7 is a flowchart showing a data training method for a memory device, according to some implementations.

Referring to FIG. 7, the SoC 110 according to some implementations may sequentially record pieces of data, to which different delay times are applied, in the memory device 120, may continuously read stored pieces of data, and may perform data training on the memory device 120.

In operation S10, the SoC 110 may sequentially transmit a plurality of write commands to the memory device 120.

In more detail, the SoC 110 may sequentially transmit a plurality of write commands to the memory device 120 so as to have a specified time interval.

Here, the specified time interval may be understood as a time obtained by adding the time corresponding to a data burst length of each write command and the time required to apply a different delay time to each data.

Also, in operation S20, the SoC 110 may transmit the pieces of first data WDATA1*s* with different delay times to the memory device 120.

In more detail, the SoC 110 may transmit the pieces of first data WDATA1*s* with different delay times applied to the first data pattern to the memory device 120 in response to each of a plurality of write commands.

Here, to perform data training on the memory device 120 by using the first bit data, the first data pattern may be understood as a data pattern generated based on the pre-stored first edge code for the first bit.

Moreover, Here, each of the different delay times may be understood as a time that is an integer multiple of the unit delay time determined based on the pre-stored first edge code.

According to some implementations, after a time has elapsed by a write delay WL from a point in time when the first write command WR1 is output, the SoC 110 may record the 1-1st data WDATA0 to the memory device 120.

Here, the write delay WL may refer to a time until the 1-1st data WDATA0 corresponding to the first write command WR1 is written to the memory device 120 after the first write command WR1 among the plurality of write commands is transmitted.

Referring to the above-mentioned configurations, the SoC 110 may have the relatively small write delay WL by sequentially outputting the plurality of write commands, compared to a case where write commands and read commands for the pieces of first data WDATA1*s* are output alternately.

In this way, the memory system 100 according to some implementations of the present disclosure may minimize the time required for data training on the memory device 120.

Moreover, in operation S30, the SoC 110 may transmit a plurality of read commands to the memory device 120.

In more detail, the SoC 110 may continuously transmit read commands respectively corresponding to the pieces of first data WDATA1*s*, which are stored in the memory device 120, to the memory device 120.

After the specified transition time WTR from a point in time when the SoC 110 transmits a plurality of write commands to the memory device 120, the SoC 110 may continuously transmit a plurality of read commands to the memory device 120.

For example, the SoC 110 may transmit a plurality of read commands to the memory device 120 so as to have a time interval corresponding to the data burst length of each read command.

Furthermore, the SoC 110 may receive the pieces of first reception data RDATA1s output from the memory device 120 in response to a plurality of read commands.

In other words, the SoC 110 may continuously read the pieces of first reception data RDATA1s from the memory device 120 by continuously transmitting the plurality of read commands to the memory device 120.

According to some implementations, after a time corresponding to the read delay RL has elapsed from a point in time when the first read command RD1 is output, the SoC 110 may read the 1-1st reception data RDATA0 from the memory device 120.

Here, the read delay RL may refer to a time until the 1-1st reception data RDATA0 corresponding to the first read command RD1 is read from the memory device 120 after the first read command RD1 among the plurality of read commands is transmitted.

Referring to the above-mentioned configurations, the SoC 110 may have the relatively small read delay RL by continuously outputting the plurality of read commands, compared to a case where write commands and read commands for the pieces of first data WDATA0 to WDATA0 are output alternately.

In addition, compared to a case of alternately outputting a write command and a read command for each of the piece of first data WDATA0 to WDATA0, the SoC 110 may have a relatively small transition time WTR.

Through the above-mentioned configurations, the memory system 100 according to some implementations of the present disclosure may minimize the time required for data training on the memory device 120.

Moreover, in operation S40, the SoC 110 may obtain a first delay value based on the data pattern of each of the pieces of first reception data RDATA1s read from the memory device 120.

In more detail, the SoC 110 may obtain the first delay value by comparing the data pattern of each of the pieces of first reception data RDATA1s read from the memory device 120 with the data pattern of each of the pieces of first data WDATA1s.

Here, the first delay value may be understood as a value including at least part of the extent, to which the data signal corresponding to the first bit is delayed due to changes in the characteristics of the memory device 120, and a direction in which the data signal corresponding to the first bit is delayed due to changes in the characteristics of the memory device 120.

For example, the SoC 110 may determine that a delay has occurred, based on the matching of the data pattern between at least some of the pieces of first reception data RDATA1s and the data pattern of the corresponding pieces of first data WDATA1s, is changed due to changes in the characteristics of the memory device 120.

Here, the SoC 110 may obtain the first delay value based on at least some of the number, placement, and order of data in which the matching of the data pattern between the pieces of first reception data RDATA1s and the corresponding pieces of first data WDATA1s is changed due to changes in the characteristics of the memory device 120.

For example, when the matching of the data pattern between the 1-2nd reception data RDATA1 and the 1-2nd data WDATA1 among the pieces of first reception data RDATA1s is changed due to a change in the characteristics of the memory device 120, the SoC 110 may determine that the data signal transmitted to the memory device 120 is delayed by the first delay value DL1 corresponding to one data pattern.

In another example, when the matching of the data pattern between two pieces of data recorded sequentially and the corresponding read data is changed due to changes in the characteristics of the memory device 120, the SoC 110 may determine that the data signal transmitted to the memory device 120 is delayed by twice the first delay value (DL1*2) corresponding to one data pattern.

Referring to the above-mentioned configurations, the SoC 110 may determine the delay that occurs in the data or the clock signal WCK due to a change in the characteristics of the memory device 120, by comparing the data pattern of each of the pieces of first reception data RDATA1s with the data pattern of each of the pieces of first data WDATA1s.

Referring to the above-mentioned configurations, the SoC 110 according to some implementations may sequentially transmit a plurality of write commands for writing the pieces of first data WDATA1s to the memory device 120, and then may continuously transmit a plurality of read commands.

Furthermore, the SoC 110 may sequentially identify the data pattern of the pieces of first reception data RDATA1s read in response to the plurality of read commands transmitted continuously and may compare the identified data pattern with the data pattern of the corresponding pieces of first data WDATA1s.

Moreover, the SoC 110 may determine the first delay value DL1 including the extent, to which the data signal transmitted from the SoC 110 to the memory device 120 is delayed, based on the comparison result.

In this case, the SoC 110 may determine the delay value within a relatively short time, compared to the case that the SoC 110 alternately outputs a write command and a read command for each of the pieces of first data WDATA1s and determines a delay value depending on the data pattern of data read depending on each read command.

Through the above-mentioned configurations, the memory system 100 according to some implementations of the present disclosure may minimize the time required for data training on the memory device 120.

FIG. 8 is a flowchart showing a method of controlling the delay of a data signal transmitted to a memory device based on a delay value obtained through data training, according to some implementations.

Referring to FIGS. 7 and 8 together, the SoC 110 according to some implementations may control the delay of a data signal transmitted to the memory device 120 by using a delay value determined depending on write commands and read commands, which are sequentially transmitted.

In operation S51, the SoC 110 according to some implementations may store a first update code in the code storage circuit 118.

In more detail, the SoC 110 may generate a first update code, which is obtained by reflecting the first delay value DL1 to the pre-stored first edge code, in response to the first bit.

Furthermore, the SoC 110 may store the generated first update code in the code storage circuit 118.

Moreover, in operation S52, the SoC 110 according to some implementations may control the delay of the data signal transmitted to the memory device 120 based on the first update code.

In more detail, the SoC 110 may control the delay of a data signal transmitted to the memory device 120 based on the first update code stored in the code storage circuit 118.

For example, the SoC 110 may compensate for the delay caused by changes in the characteristics of the memory device 120 with respect to the data signal transmitted to the memory device 120 based on the first update code.

According to some other implementations, the SoC 110 may control the delay of the clock signal WCK, which is transmitted to the memory device 120, based on the first update code stored in the code storage circuit 118.

Through the above-mentioned configurations, the memory system 100 (or the SoC 110) according to some implementations of the present disclosure may perform data training on the memory device 120 in a minimal amount of time.

FIG. 9 is a flowchart showing a method, in which the SoC outputs pieces of first data with different delay times, according to some implementations.

Referring to FIG. 9, the SoC 110 according to some implementations may output pieces of data WDATAs with different delay times applied to data patterns.

In operation S21, the SoC 110 according to some implementations may generate the first data pattern DP1 based on a first edge code.

In more detail, the SoC 110 may generate the first data pattern DP1 for performing data training on the memory device 120 based on the pre-stored first edge code.

For example, the SoC 110 (or the pattern generating circuit 115) may generate the first data pattern DP1 based on the first edge code in response to receiving a first generation command generated according to a predetermined period.

In another example, the SoC 110 may generate the first data pattern DP1 based on the first edge code in response to a characteristic variation value of the memory device 120 exceeding a threshold value.

Here, the first edge code according to some other implementations may refer to a data pattern obtained through data training previously performed on the memory device 120 by the control logic circuit 111.

For example, in a data training process previously performed on the memory device 120 by the control logic circuit 111, the first edge code may include edge information of pieces of data, which are recorded in the memory device 120 after the rising edge of the clock signal WCK, from among the pieces of first data WDATA1*s*.

In another example, in a data training process previously performed on the memory device 120 by the control logic circuit 111, the first edge code may include edge information of pieces of data that match a data pattern of data output from the SoC 110 with a data pattern of data read from the memory device 120.

In still another example, the first edge code may include center information of data output from the SoC 110 and then recorded in the memory device 120.

However, information included in the first edge code is not limited to the examples described above. For example, it may be understood as including various pieces of information about a data signal output from the SoC 110 and then recorded in the memory device 120.

Moreover, in operation S22, the SoC 110 according to some implementations may output the pieces of first data WDATA1*s* by applying different delay times to the first data pattern DP1.

In more detail, the SoC 110 (or the delay control circuit 116) may output the pieces of first data WDATA1*s* as many as the specified number by applying different delay times to the first data pattern DP1 output from the pattern generating circuit 115.

According to some implementations, the SoC 110 may output the pieces of first data WDATA1*s* as many as the specified number by applying a delay time corresponding to a different integer multiple of the unit delay time for the first data pattern DP1.

For example, the SoC 110 may output pieces of data between the 1-1st data WDATA0 advanced by twice the unit delay time based on the first data pattern DP1, and the 1-5th data WDATA4 delayed by twice the unit delay time based on the first data pattern DP1.

Furthermore, the SoC 110 may sequentially transmit the pieces of first data WDATA1*s* to the memory device 120.

In more detail, the SoC 110 may sequentially transmit the pieces of first data WDATA1*s* to the memory device 120 in response to the plurality of write commands sequentially transmitted to the memory device 120.

Referring to the above-mentioned configurations, the SoC 110 according to some implementations may have the relatively small write delay WL compared to the case where the SoC 110 alternately outputs a write command and a read command for each of the pieces of first data WDATA1*s*.

In this way, the memory system 100 according to some implementations of the present disclosure may minimize the time required for data training on the memory device 120.

FIG. 10 is a block diagram showing a memory system, according to still some other implementations.

Referring to FIG. 10, a memory system 100C according to some implementations includes a SoC 110C and a memory device 120. Moreover, the SoC 110C according to some implementations includes a control logic circuit 111C, a code storage circuit 118, a memory interface 112C, and a detector 1018.

Moreover, the memory system 100C and the SoC 110C shown in FIG. 2A may be understood as examples of the memory system 100A and the SoC 110A shown in FIG. 2A, respectively. Accordingly, the same reference numerals are used for components the same or substantially the same as the above-described components, and descriptions the same as the above-described descriptions are omitted to avoid redundancy.

According to some implementations, the SoC 110C further includes the detector 1018 that detects changes in characteristics of the memory device 120.

The detector 1018 according to some implementations may be connected to the memory device 120 to detect changes in characteristics inside or outside the memory device 120.

For example, the detector 1018 may detect temperature changes and/or voltage changes inside or outside the memory device 120.

However, according to some other implementations, the detector 1018 may be implemented as a separate configuration from the SoC 110C and may be connected to the SoC 110C.

When a characteristic variation value of the memory device 120 detected through the detector 1018 exceeds a threshold value, the control logic circuit 111C according to some implementations may perform data training on the memory device 120.

For example, when a temperature variation value of the memory device 120 detected through the detector 1018 exceeds the threshold value, the control logic circuit 111C may perform data training on the memory device 120.

In another example, when the variation value of a voltage applied to a specific point inside the memory device 120 detected through the detector 1018 exceeds the threshold value, the control logic circuit 111C may perform data training on the memory device 120.

To this end, the control logic circuit 111C may generate a first variation command in response to the characteristic variation value of the memory device 120 exceeding the threshold value.

In more detail, the control logic circuit 111C may generate the first variation command for generating a first variation data pattern in response to the characteristic variation value of the memory device 120 exceeding the threshold value.

Accordingly, the pattern generating circuit 115 may generate a first variation data pattern VDP1 in response to the first variation command generated as the characteristic variation value of the memory device 120 exceeds the threshold value.

In more detail, the pattern generating circuit 115 may generate the first variation data pattern VDP1 corresponding to the pre-stored first edge code in response to the first variation command generated as the characteristic variation value of the memory device 120 exceeds the threshold value.

Moreover, the delay control circuit 116 according to some implementations may generate pieces of first variation data VDQ1*s* by applying different delay times to the first variation data pattern VDP1.

In more detail, the delay control circuit 116 may apply different delay times to the first variation data pattern VDP1 through the delay cell 119 included in the memory interface 112C.

The delay control circuit 116 may control the delay cell 119 such that the memory interface 112C outputs the pieces of first variation data VDQ1*s* with different delay times applied to the first variation data pattern VDP1.

According to some implementations, the SoC 110C (or the control logic circuit 111C) may sequentially transmit a plurality of write commands to the memory device 120 so as to have a specified time interval.

Here, the specified time interval may be understood as a time obtained by adding the time corresponding to a data burst length of each write command and the time required to apply a different delay time to each data.

Moreover, the SoC 110C according to some implementations may transmit the pieces of first variation data VDQs with different delay times, which are applied to the first variation data pattern VDP1, to the memory device 120 in response to a plurality of write commands, respectively.

Also, the SoC 110 may continuously transmit read commands respectively corresponding to the pieces of first data VDQ1*s*, which are stored in the memory device 120, to the memory device 120.

After the specified transition time WTR from a point in time when the SoC 110C transmits a plurality of write commands to the memory device 120, the SoC 110 may continuously transmit a plurality of read commands to the memory device 120.

Here, for example, the SoC 110C may transmit a plurality of read commands to the memory device 120 so as to have a time interval corresponding to the data burst length of each read command.

Furthermore, the SoC 110C may receive pieces of first reception variation data RVDQ1*s* output from the memory device 120 in response to a plurality of read commands.

In other words, the SoC 110C may continuously read the pieces of first reception variation data VRDQ1*s* from the memory device 120 by continuously transmitting the plurality of read commands to the memory device 120.

Furthermore, the SoC 110C according to some implementations may obtain a delay value based on the data pattern of each of the pieces of first reception variation data VRDQ1*s* read from the memory device 120.

In more detail, the SoC 110C may obtain the delay value by comparing the data pattern of each of the pieces of first reception variation data VRDQ1*s* read from the memory device 120 with the data pattern of each of the pieces of first variation data VDQ1*s*.

Here, the delay value may be understood as a value including at least part of the extent, to which the data signal corresponding to the first bit is delayed due to changes in the characteristics of the memory device 120, and a direction in which the data signal corresponding to the first bit is delayed due to changes in the characteristics of the memory device 120.

Furthermore, the SoC 110C may control the delay of the data signal transmitted to the memory device 120 based on the obtained delay value.

In more detail, the SoC 110C may store the first update code, which is obtained by reflecting the obtained delay value to the first edge code, in the code storage circuit 118. Moreover, the SoC 110C may control the delay of the data signal transmitted to the memory device 120 by using the first update code stored in the code storage circuit 118.

Referring to the above-mentioned configurations, when a characteristic variation value of the memory device 120 exceeds a threshold value, the SoC 110C according to some implementations may perform data training on the memory device 120.

Here, a data training process performed on the memory device 120 by the SoC 110C may be understood as being substantially the same as a data training process for the memory device 120 described through FIGS. 2A to 4.

Accordingly, the SoC 110C may sequentially transmit a plurality of write commands for writing the pieces of first variation data VDQ1*s* to the memory device 120, and then may continuously transmit a plurality of read commands.

Furthermore, the SoC 110C may sequentially identify the data pattern of the pieces of first reception variation data VRDQ1*s* read in response to the plurality of read commands transmitted continuously and may compare the identified data pattern with the data pattern of the corresponding pieces of first variation data VDQ1*s*.

Moreover, the SoC 110C may determine a delay value including the extent, to which the data signal transmitted from the SoC 110C to the memory device 120 is delayed, based on the comparison result.

In this case, the SoC 110C may determine the delay value within a relatively short time, compared to the case that the SoC 110C alternately outputs a write command and a read command for each of the pieces of first variation data VDQ1*s* and determines a delay value depending on the data pattern of data read depending on each read command.

Through the above-mentioned configurations, the memory system 100C according to some implementations of the present disclosure may minimize the time required for data training on the memory device 120.

FIG. 11 is a block diagram showing an example of the SoC of FIG. 1.

Referring to FIG. 11, a SoC 110D may be connected to the memory device 120 and a storage device 1500. Although not illustrated in drawing, the system-on-chip 110D may also be connected with a device such as a liquid crystal display device or a touch panel.

Here, the SoC 110D shown in FIG. 11 may be understood as an example of the SoC 110 shown in FIG. 1.

The SoC 110D includes a CPU 210, a controller 220, an SRAM 230, a user interface (UI) controller 240, a storage interface 250, and a system interconnector 260. However, this is an example, and the components of the SoC 110D are not limited to the configurations shown.

The CPU 210 executes software (e.g., an application program, an operating system, and device drivers) on the SoC 110D. The CPU 210 may execute the operating system OS loaded onto the memory device 120. The CPU 210 may execute various application programs to be driven based on the operating system OS. For example, the CPU 210 may fetch and execute a training code loaded onto the SRAM 230 or the memory device 120. The CPU 210 may control the controller 220 such that the training operation of the memory device 120 requested according to the execution of the training code is performed.

The controller 220 according to some implementations provides interfacing between the memory device 120 and the SoC 110D. The controller 220 may access the memory device 120 at the request of the CPU 210 or any other IP. For example, the controller 220 may write data in the memory device 120 at a write request of the CPU 210. Alternatively, the controller 220 may read data from the memory device 120 and may deliver the read data to the CPU 210 or the storage interface 250.

The controller 220 according to some implementations includes the memory interface 112 that provides interfacing between the memory device 120 and the SoC 110D.

Moreover, the controller 220 includes the control logic circuit 111 that accesses the memory device 120 and controls the operation of the memory device 120.

The control logic circuit 111 may sequentially transmit a plurality of write commands to the memory device 120 through the memory interface 112, and then may continuously transmit a plurality of read commands.

Furthermore, the control logic circuit 111 may obtain a delay value according to changes in the characteristics of the memory device 120 based on the data pattern of pieces of data that are sequentially read.

In this way, the control logic circuit 111 (or the SoC 110D) may perform data training on the memory device 120 by using a minimal time.

Here, operations of the control logic circuit 111 and the memory interface 112 may be understood as substantially the same as operations of the control logic circuit 111 and the memory interface 112 described in FIG. 1.

The SRAM 230 may be provided as a working memory of the CPU 210. For example, a boot loader or codes for executing booting may be loaded onto the SRAM 230. For example, the training code may be loaded onto the SRAM 230 for data training. In addition, when the control logic circuit 111 according to some implementations of the present disclosure is provided in a form of a training code, the control logic circuit 111 may be loaded onto the SRAM 230.

The user interface controller 240 may control user inputs and outputs from and to user interface devices (e.g., a keyboard, a touch panel, and a display).

The storage interface 250 may control the storage device 1500 at the request of the CPU 210. That is, the storage interface 250 may provide an interface between the SoC 110D and the storage device 1500.

The system interconnector 260 may be a system bus for providing an on-chip network within the SoC 110D. The system interconnector 260 may include, for example, a data bus, an address bus, and a control bus.

The storage device 1500 may be provided as a storage medium of the SoC 110D. The storage device 1500 may store application programs, the OS image, and various kinds of data. For example, a training code for training the memory device 120 may be stored in a specific area of the storage device 1500.

FIG. 12 is a block diagram showing an example of the memory device of FIG. 1.

Referring to FIG. 12, the memory device 120 includes an address buffer 310, a row decoder 320, a column decoder 330, a memory cell array 340, a sense amplifier 350, and an input/output (I/O) buffer 360.

The address buffer 310 may receive an address ADDR from the controller 220. The address buffer 310 may transmit a row address ADDR_row to the row decoder 320 and may transmit a column address ADDR_col to the column decoder 330.

The row decoder 320 may select one of a plurality of word lines connected to the memory cell array 340 in response to the row address ADDR_row.

The column decoder 330 may select one of a plurality of bit lines BL connected to the memory cell array 340 in response to the column address ADDR_col. The column decoder 330 may activate the selected bit line in response to a control signal CAS.

The memory cell array 340 may include a plurality of memory cells. The plurality of memory cells may be located at intersections of a plurality of word lines and a plurality of bit lines, respectively. The plurality of memory cells may be connected with a plurality of word lines and a plurality of bit lines. The plurality of memory cells may be provided in a matrix form. The plurality of word lines may be connected to rows of memory cells in the memory cell array 340. The plurality of bit lines may be connected to columns of memory cells in the memory cell array 340.

For example, the memory cell array 340 may include cells of a dynamic random access memory (DRAM), a synchronous DRAM (SDRAM), a double date rate SDRAM (DDR SDRAM), a DDR2 SDRAM, and a DDR3 SDRAM. However, this is an example, and the memory cells of the memory cell array 340 may be provided as cells of a random access memory (RAM) such as a phase-change RAM (PRAM), a magnetic RAM (MRAM), a resistive RAM (RRAM), and a static RAM (SRAM).

The sense amplifier 350 may be connected to the plurality of bit lines connected to the memory cell array 340. The sense amplifier 350 may sense a voltage change of a bit line activated among the plurality of bit lines and may amplify and output the sensed voltage change.

The I/O buffer 360 may output data WDATAs to an external device based on the voltage amplified from the sense amplifier 350.

In some implementations of the present disclosure, the I/O buffer 360 may continuously transmit stored data to the SoC 110 in response to read commands that are continuously received.

As described above, the SoC 110 according to some implementations may sequentially transmit a plurality of write commands for the pieces of first data WDATA1*s* to the memory device 120, and then may continuously transmit a plurality of read commands.

Furthermore, the SoC 110 may sequentially identify the data pattern of the pieces of first reception data RDQ1*s* read in response to the plurality of read commands transmitted continuously and may compare the identified data pattern with the data pattern of the corresponding pieces of first data WDATA1*s*.

Moreover, the SoC 110 may determine the first delay value DL1 including the extent, to which the data signal transmitted from the SoC 110 to the memory device 120 is delayed, based on the comparison result.

In this case, the SoC 110 may determine the delay value within a relatively short time, compared to the case that the SoC 110 alternately outputs a write command and a read command for each of the pieces of first data WDATA1*s* and determines a delay value depending on the data pattern of read data.

Through the above-mentioned configurations, the memory system 100 according to some implementations of the present disclosure may minimize the time required for data training on the memory device 120.

According to some implementations of the present disclosure, a SoC may reduce the time required to perform data training on a memory device.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described with reference to some implementations thereof, it will be apparent to those of ordinary skill in the art that various changes and modifications may be made thereto without departing from the spirit and scope of the present disclosure as set forth in the following claims.

What is claimed is:

1. A system-on-Chip (SoC) communicating with a memory device, the SoC comprising:

a memory interface configured to exchange a command and data with the memory device; and a control logic circuit configured to transmit a clock signal and a plurality of data signals to the memory device through the memory interface, wherein the control logic circuit is configured to:

sequentially transmit a plurality of pieces of first data with a plurality of different delay times to the memory device through the memory interface based on a pre-stored first edge code;

continuously transmit, to the memory device, a plurality of read commands for reading the plurality of pieces of first data stored in the memory device from the memory device; and obtain a first delay value based on a data pattern of each of a plurality of pieces of first reception data, wherein the first delay value includes an extent to which the plurality of pieces of first data are delayed, and wherein the plurality of pieces of first reception data are read from the memory device in response to the plurality of read commands.

2. The SoC of claim 1, further comprising:

a code storage circuit configured to store the first edge code, wherein the control logic circuit is configured to store a first update code obtained by reflecting the first delay value to the first edge code in the code storage circuit.

3. The SoC of claim 2, wherein the control logic circuit is configured to control a delay of a data signal transmitted to the memory device through the memory interface based on the first update code.

4. The SoC of claim 1, wherein the control logic circuit is configured to:

sequentially transmit a plurality of write commands to the memory device according to a specified time interval, wherein the plurality of write commands respectively correspond to the plurality of pieces of first data; and continuously transmit the plurality of read commands to the memory device after a predetermined transition time from a point in time when the plurality of write commands are transmitted.

5. The SoC of claim 4, wherein the control logic circuit is configured to:

sequentially write the plurality of pieces of first data in the memory device after a time corresponding to a write delay has elapsed from a point in time when a first write command among the plurality of write commands is transmitted; and continuously read the plurality of pieces of first reception data from the memory device after a time corresponding to a read delay has elapsed from a point in time when a first read command among the plurality of read commands is transmitted.

6. The SoC of claim 1, wherein the control logic circuit includes:

a pattern generating circuit configured to generate a first data pattern based on the first edge code; and a delay control circuit configured to output the plurality of pieces of first data by applying the plurality of different delay times to the first data pattern.

7. The SoC of claim 6, wherein the memory interface includes a delay cell connected to the delay control circuit, and wherein the delay control circuit is configured to output the plurality of pieces of first data by applying a delay corresponding to an integer multiple of a unit delay time to the first data pattern through the delay cell.

8. The SoC of claim 6, wherein the control logic circuit further includes a pattern checking circuit connected to the memory interface, wherein the pattern checking circuit is configured to compare the data pattern of each piece of the plurality of pieces of first reception data read from the memory device with a data pattern of corresponding data among the plurality of pieces of first data, and wherein the delay control circuit is configured to determine the first delay value based on the comparison result.

9. The SoC of claim 6, wherein the pattern generating circuit is configured to generate the first data pattern based on a first generation command generated by the control logic circuit depending on a predetermined period.

10. The SoC of claim 6, further comprising:

a detector configured to detect a characteristic variation of the memory device, wherein when a characteristic variation value of the memory device detected through the detector exceeds a threshold value, the control logic circuit is configured to generate a first variation command, wherein the pattern generating circuit is configured to generate first variation data pattern based on the first edge code in response to the first variation command, and wherein the delay control circuit is configured to output pieces of variation data by applying the plurality of different delay times to the first variation data pattern.

11. The SoC of claim 1, wherein the control logic circuit is configured to:

sequentially transmit a plurality of pieces of second data to the memory device through the memory interface based on a second edge code distinct from the first edge code, wherein another plurality of different delay times are applied to the plurality of pieces of second data;

continuously transmit a plurality of read commands for reading the pieces of second data stored in the memory device from the memory device; and obtain a second delay value based on a data pattern of each of pieces of second reception data read from the memory device, wherein the second delay value includes an extent to which the plurality of pieces of second data are delayed.

12. A data training method for a memory device, the method comprising:

sequentially transmitting a plurality of write commands to the memory device according to a specified time interval;

sequentially transmitting a plurality of pieces of first data with a plurality of different delay times to the memory device through a memory interface based on a pre-stored first edge code in response to each of the plurality of write commands;

continuously transmitting, to the memory device, a plurality of read commands for reading the plurality of pieces of first data stored in the memory device from the memory device; and obtaining a first delay value based on a data pattern of pieces of first reception data read from the memory device, wherein first delay value includes an extent to which the plurality of pieces of first data are delayed.

13. The method of claim 12, further comprising:

storing a first update code obtained by reflecting the first delay value to the first edge code in a code storage circuit; and controlling a delay of a data signal transmitted to the memory device through the memory interface based on the first update code stored in the code storage circuit.

14. The method of claim 12, wherein the transmitting of the plurality of pieces of first data to the memory device includes:

generating a first data pattern based on the first edge code; and outputting the plurality of pieces of first data by applying the plurality of different delay times to the first data pattern.

15. The method of claim 14, further comprising:

determining the first delay value by comparing the data pattern of each piece of the plurality of pieces of first reception data read from the memory device with a data pattern of each piece of the plurality of pieces of first data.

16. A memory system comprising:

a memory device; and a SoC configured to control a memory operation of the memory device, wherein the SoC is configured to:

sequentially transmit a plurality of pieces of first data with a plurality of different delay times to the memory device based on a pre-stored first edge code;

continuously transmit, to the memory device, a plurality of read commands for reading the plurality of pieces of first data stored in the memory device from the memory device; and obtain a first delay value based on a data pattern of each piece of a plurality of pieces of first reception data read from the memory device, wherein the plurality of pieces of first data are delayed in the memory device by the first delay value.

17. The memory system of claim 16, wherein the SoC further includes: a code storage circuit configured to store the first edge code, and wherein the SoC is configured to store a first update code obtained by reflecting the first delay value to the first edge code in the code storage circuit.

18. The memory system of claim 16, wherein the first delay value includes a delay direction and a delay degree, and wherein the SoC is configured to adjust, based on the delay direction and the delay degree, a delay of a data signal transmitted to the memory device.

19. The memory system of claim 16, wherein the memory device includes at least one of a dynamic random access memory (DRAM), a first in first out (FIFO) memory, or a scratchpad memory.

20. The memory system of claim 16, wherein the SoC is configured to determine the first delay value by comparing (i) the data pattern of each piece of the plurality of pieces of first reception data read from the memory device with (ii) a data pattern of corresponding data among the plurality of pieces of first data.

* * * * *